US012117042B2

(12) United States Patent
Murai et al.

(10) Patent No.: US 12,117,042 B2
(45) Date of Patent: Oct. 15, 2024

(54) ROLLER BEARING, ROLLER BEARING UNIT, MOTOR, METHOD FOR MANUFACTURING ROLLER BEARING, AND METHOD FOR SILENCING ROLLER BEARING

(71) Applicant: NSK LTD., Tokyo (JP)

(72) Inventors: Takashi Murai, Fujisawa (JP); Yoshinari Kagota, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/914,114

(22) PCT Filed: Mar. 4, 2022

(86) PCT No.: PCT/JP2022/009565
§ 371 (c)(1),
(2) Date: Sep. 23, 2022

(87) PCT Pub. No.: WO2022/209598
PCT Pub. Date: Oct. 6, 2022

(65) Prior Publication Data
US 2024/0209892 A1  Jun. 27, 2024

(30) Foreign Application Priority Data

Mar. 31, 2021 (JP) .................................. 2021-062261
Mar. 31, 2021 (JP) .................................. 2021-062262

(51) Int. Cl.
*F16C 19/26* (2006.01)
*F16C 19/36* (2006.01)
(Continued)

(52) U.S. Cl.
CPC .............. *F16C 19/26* (2013.01); *F16C 33/34* (2013.01); *F16C 33/366* (2013.01);
(Continued)

(58) Field of Classification Search
CPC ...... F16C 19/26; F16C 19/362; F16C 19/364; F16C 33/34; F16C 33/366; F16C 2380/26
See application file for complete search history.

(56) References Cited

U.S. PATENT DOCUMENTS 3,351,398 A * 11/1967 Park ........................ F16C 33/60
384/456
4,730,995 A * 3/1988 Dewhirst ................ F01C 21/02
384/563

(Continued)

FOREIGN PATENT DOCUMENTS

GB          927512 A  *  5/1963
GB        2 057 593 A     4/1981
(Continued)

OTHER PUBLICATIONS

International Search Report dated May 17, 2022 issued by the International Searching Authority in counterpart International Application No. PCT/JP2022/009565 (PCT/ISA/210).
(Continued)

*Primary Examiner* — Phillip A Johnson
(74) *Attorney, Agent, or Firm* — Sughrue Mion, PLLC

(57) ABSTRACT

A roller includes chamfered portions and roller inclined surfaces formed on both axial ends of a roller outer circumferential surface. When in a cross section taken along a plane including a rotation axis of the roller and a bearing central axis, an intersection angle between a tangent line of the roller inclined surface at the first position of the roller inclined surface corresponding to an end portion of a guide surface and a perpendicular line of the rotation axis is defined as $\alpha$, an intersection angle between a tangent line of the roller inclined surface at the second position corresponding to a boundary between the chamfered portion and the roller inclined surface and a perpendicular line of the rotation axis is defined as $\beta$, and an intersection angle between (Continued)

the guide surface and a perpendicular line of the bearing central axis is defined as θ, $\alpha<\theta<\beta$ is satisfied.

10 Claims, 17 Drawing Sheets

(51) Int. Cl.
  *F16C 33/34* (2006.01)
  *F16C 33/36* (2006.01)
  *F16C 33/58* (2006.01)
(52) U.S. Cl.
  CPC .......... *F16C 33/583* (2013.01); *F16C 33/585* (2013.01); *F16C 19/362* (2013.01); *F16C 19/364* (2013.01); *F16C 2380/26* (2013.01)

(56) References Cited

U.S. PATENT DOCUMENTS

| | | | |
|---|---|---|---|
| 5,716,146 | A | 2/1998 | Murai et al. |
| 6,196,724 | B1 | 3/2001 | Murai et al. |
| RE48,586 | E | 6/2021 | Murai et al. |
| 2003/0012477 | A1 | 1/2003 | Murai et al. |
| 2006/0126983 | A1 | 6/2006 | Takemura et al. |
| 2009/0304320 | A1* | 12/2009 | Bayer .................. F16C 25/083 384/548 |
| 2011/0091145 | A1 | 4/2011 | Ito |
| 2014/0328554 | A1 | 11/2014 | Toda |

FOREIGN PATENT DOCUMENTS

| | | | | |
|---|---|---|---|---|
| JP | 51-2856 | A | 1/1976 | |
| JP | 58-22515 | U | 2/1983 | |
| JP | 62-270825 | A | 11/1987 | |
| JP | 6-58334 | A | 3/1994 | |
| JP | 9-291942 | A | 11/1997 | |
| JP | 11-344035 | A | 12/1999 | |
| JP | 2000-18242 | A | 1/2000 | |
| JP | 2000-161367 | A | 6/2000 | |
| JP | 2003-21145 | A | 1/2003 | |
| JP | 2004011821 | A * | 1/2004 | ............ F16C 19/225 |
| JP | 2004-176745 | A | 6/2004 | |
| JP | 2005-3121 | A | 1/2005 | |
| JP | 2006-316917 | A | 11/2006 | |
| JP | 2007162893 | A * | 6/2007 | .............. F16C 33/34 |
| JP | 2010-1992 | A | 1/2010 | |
| JP | 2013-117249 | A | 6/2013 | |

OTHER PUBLICATIONS

International Written Opinion dated May 17, 2022 issued by the International Searching Authority in counterpart International Application No. PCT/JP2022/009565 (PCT/ISA/237).
Communication dated Mar. 18, 2024, issued by European Patent Office in European Patent Application No. 22773579.2.

* cited by examiner

ROLLER BEARING, ROLLER BEARING UNIT, MOTOR, METHOD FOR MANUFACTURING ROLLER BEARING, AND METHOD FOR SILENCING ROLLER BEARING

CROSS REFERENCE TO RELATED APPLICATIONS

This application is a National Stage of International Application No. PCT/JP2022/009565 filed on Mar. 4, 2022 claiming priority from JP Applications No. 2021-062261 Mar. 31, 2021 and No. 2021-062262 Mar. 31, 2021, the disclosures of which are incorporated herein in their entirety by reference.

TECHNICAL FIELD

The present invention relates to a roller bearing, a roller bearing unit, a motor, a method for manufacturing a roller bearing, and a method for silencing a roller bearing.

BACKGROUND ART

In general, in a cylindrical roller bearing, a tapered roller bearing, or the like, a configuration is known in which in order to guide a plurality of rollers in a circumferential direction of a bearing ring, a flange portion is provided at an end portion of the bearing ring and end surfaces of the rollers are in sliding contact with the flange portion, and high resistance to a large axial load is required in some cases (Patent Literatures 1 and 2).

According to a configuration of the roller bearing of Patent Literature 1, an axial resistance performance is improved by grinding the end surface of the cylindrical roller at a portion in sliding contact with the flange portion such that an outline of a cross section thereof is a specific curve.

Further, in a configuration of the roller bearing of Patent Literature 2, an axial resistance performance is improved by providing the end surface of the cylindrical roller with a convex crowning portion passing through a first position and a second position on the end surface of the cylindrical roller.

In general, it is known in a rolling bearing, that reduction in noise is required as one of required performances, and in particular, in a cylindrical roller bearing at the time of grease lubrication, when a plurality of cylindrical rollers roll and move on a raceway surface in a non-load zone (including entrance and exit of a load zone), a squeaking sound which is a kind of noise is generated. As a technique for reducing the squeaking sound, which is a kind of noise, there are techniques disclosed in, for example, Patent Literatures 3 to 6.

In a cylindrical roller bearing of Patent Literature 3, a relationship between a diameter of an outer circumferential surface of a cage and a thickness of an annular gap existing between an inner circumferential surface of a flange portion and the outer circumferential surface of the cage is defined, and a sound pressure level of a squeaking sound and a cage sound is lowered.

In a squeaking sound-reduced radial bearing of Patent Literature 4, a separator having a roller guide surface for guiding rollers is interposed between adjacent rolling elements in an annular space between an inner ring and an outer ring, to reduce generation of the squeaking sound.

In a cylindrical roller bearing of Patent Literature 5, a contour of a roller rolling surface is formed in a linear shape parallel to an axis at a central portion thereof, and inclinations of a column-side surface of a pocket of a cage in a circumferential direction and a radial direction are limited, thereby inclinations of the roller with respect to a revolving direction and the radial direction are restrained, and vibration and noise levels are reduced.

In a cylindrical roller bearing of Patent Literature 6, in a polygonal curved surface of an outer ring raceway in which a plurality of constituent curved surfaces are connected at a constant phase angle, and connection points between the constituent curved surfaces are on the same tangent plane, thereby reducing generation of a squeaking sound.

Patent Literature 1: JP 2003-21145 A
Patent Literature 2: JP 2005-3121 A
Patent Literature 3: JP H09-291942 A
Patent Literature 4: JP H06-58334 A
Patent Literature 5: JP H11-344035 A
Patent Literature 6: JP S62-270825 A However, in a case where the end surface shape of the roller is defined by a curve passing through each of the above-described points, it is confirmed that when the end surface of the roller has a relatively large radius of curvature (close to a linear shape), a discontinuous edge portion is generated at an intersection point between the end surface of the roller and a chamfer formed at an axial end portion of the end surface. In a case where such an edge portion is present, when a large axial load is received or when the roller is skewed during high-speed rotation, the edge portion of the roller comes into contact with the flange portion and an edge load is likely to generate. Therefore, under severe use conditions, a contact surface pressure increases in some cases, which may cause temperature rise, seizing, galling, and the like.

In general, in a roller bearing, a roller rolling surface may be formed in a crowning shape in order to alleviate an edge load of a roller caused by a load. In Patent Literature 3, a movement of a rolling element (roller), which is a main cause of the generation of squeaking sound, is restrained by forming the roller rolling surface into a full straight shape. Further, while restraining the movement of the roller, a movement of the cage is regulated by the thickness of the annular gap present between the inner circumferential surface of the flange portion formed at the end portion of the outer ring and the outer circumferential surface of the cage.

According to such a cage, disturbance vibration of the rollers in the pockets is restrained by damping characteristics of the cage obtained by viscosity characteristics of grease present between the cage and the outer ring or the inner ring. In addition, even when the rollers behave with slippage under some circumstances (cause of the occurrence of the squeaking sound), the movement of the roller in each pocket can be restrained by the damping characteristics based on the viscosity characteristics of the grease, so that the squeaking sound can be reduced. In Patent Literatures 4 to 6, the squeaking sound can be reduced for the same reason as described above.

However, it is difficult to completely restrict the movement of the rollers, and for example, in a case where variations in shape of the rolling surface of the roller occur due to manufacturing, such as an inclination or unevenness, the roller tends to move unevenly, and a behavior that loses stability may occur. In addition, when grease is unevenly provided between the roller rolling surface and the outer ring (or the inner ring), the roller may be skewed, and there is a limit to reliably prevent the squeaking sound.

Further, the squeaking sound of the ball bearing and the cylindrical roller bearing incorporated in a medium-sized or large-sized motor can be prevented by applying a pre-load to the bearing in the case of the ball bearing, but the pre-load (radial pre-load, axial pre-load) may cause abnormal heat generation in the case of the cylindrical roller bearing, and the pre-load cannot be easily applied. Therefore, it is the current situation that the squeaking sound of the cylindrical roller bearing has not yet been completely prevented or solved.

Therefore, a first object of the present invention is to provide a roller bearing and a method for manufacturing a roller bearing in which a contact between an end surface of a roller and a flange portion can be made to be a contact between continuous surface shapes without an edge contact, and high axial resistance can be obtained even when a large axial load is applied or skew occurs.

Further, a second object of the present invention is to provide a roller bearing, a roller bearing unit, a motor, and a method for silencing a roller bearing in which heat generation due to an edge load can be prevented and generation of a squeaking sound can be prevented.

SUMMARY OF INVENTION

The present invention has the following configurations.

(1) A roller bearing including: an outer ring having a raceway surface on an inner circumferential surface thereof; an inner ring having a raceway surface on an outer circumferential surface thereof; and a plurality of rollers rollably disposed between the outer ring and the inner ring, in which
    on one or both of the outer ring and the inner ring, flange portions each protruding in a radial direction from the raceway surface and having a guide surface which guides each of the plurality of rollers in sliding contact with a roller end surface of each of the plurality of rollers are formed,
    each of the plurality of rollers includes chamfered portions which are formed at both axial ends of a roller outer circumferential surface, and roller inclined surfaces each of which is provided to a roller inner diameter side of the roller end surface from an axial end of the chamfered portion and faces the guide surface of the flange portion, and
    when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position, an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$, $\alpha<\theta<\beta$ is satisfied.

(2) A roller bearing unit including:
    the roller bearing according the above (1); and
    a regulation portion configured to regulate an axial movement of the inner ring or the outer ring that receives a pre-load from the pre-load unit, in which
    a constant axial pre-load in an axial direction is applied such that both end surfaces of all of the plurality of rollers incorporated in the roller bearing are in constant contact with the respective flange portions when the outer ring or the inner ring, which is a rotating ring of the roller bearing, is rotating, whereby a squeaking sound is prevented.

(3) A motor including:
    a rotation shaft on which a rotor is provided;
    a housing on which a stator is provided; and
    the roller bearing unit according to the above (2) by which the rotation shaft is rotatably supported in the housing.

(4) A method for manufacturing a roller bearing, the roller bearing including: an outer ring having a raceway surface on an inner circumferential surface thereof; an inner ring having a raceway surface on an outer circumferential surface thereof; and a plurality of rollers rollably disposed between the outer ring and the inner ring, one or both of the outer ring and the inner ring being provided a flange portion protruding in a radial direction from the raceway surface, the flange portion having a guide surface that guides each of the plurality of rollers in sliding contact with a roller end surface of each of the plurality of rollers, and each of the plurality of rollers including chamfered portions which are formed at both axial ends of a roller outer circumferential surface, and roller inclined surfaces each of which is provided to a roller inner diameter side of the roller end surface from an axial end of the chamfered portion and faces the guide surface of the flange portion,
    the method including, satisfying $\alpha<\theta<\beta$ when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position, an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$.

(5) A method for silencing a roller bearing, the roller bearing including: an outer ring having a raceway surface on an inner circumferential surface thereof: an inner ring having a raceway surface on an outer circumferential surface thereof; and a plurality of cylindrical rollers rollably disposed between the outer ring and the inner ring, each of the outer ring and the inner ring being provided flange portions each protruding in a radial direction from the raceway surface and having a guide surface which guides each of the plurality of rollers in sliding contact with a roller end surface of each of the plurality of rollers,
    the method including, applying a constant axial pre-load in an axial direction to a one-side surface of the outer ring and an another-side surface of the inner ring among one-side surfaces and another-side surfaces of the outer ring and the inner ring such that both end surfaces of all of the plurality of rollers incorporated in the roller bearing are in constant contact with the respective flange portions when the outer ring or the inner ring, which is a rotating ring of the roller bearing, is rotating, whereby preventing a squeaking sound.

According to the present invention, the contact between the end surface of the roller and the flange portion can be made to be a contact between continuous surface shapes without the edge contact, and high axial resistance can be obtained even when a large axial load is applied or skew occurs.

In addition, according to the present invention, occurrence of the squeaking sound of the cylindrical roller bearing can be completely prevented.

DESCRIPTION OF EMBODIMENTS

Hereinafter, an embodiment of the present invention will be described in detail with reference to the drawings.

Figure 1:
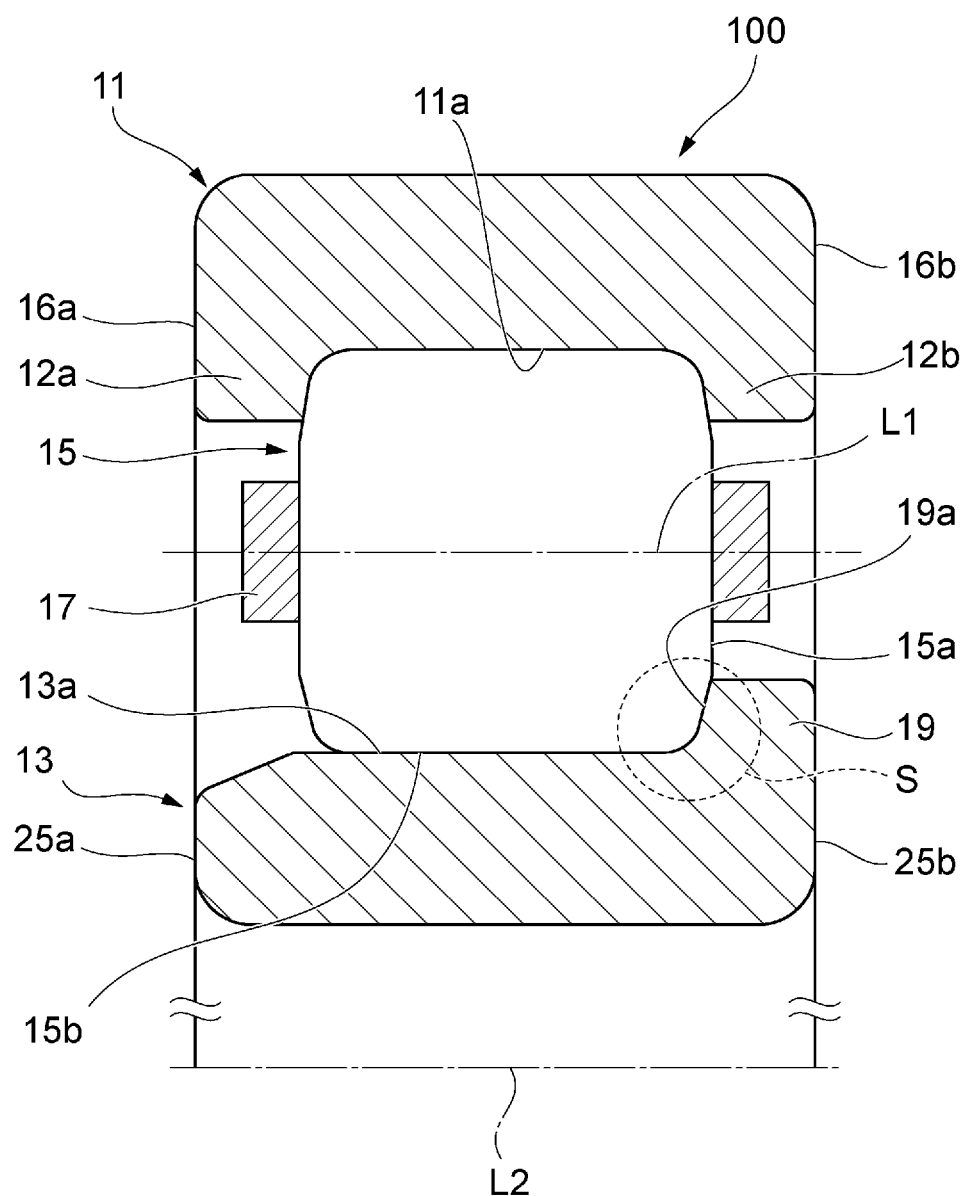
FIG. 1 is a partial cross-sectional view of a roller bearing according to a first embodiment of the present invention.

FIG. 1 is a partial cross-sectional view of a roller bearing according to a first embodiment of the present invention.

A roller bearing 100 includes an outer ring 11, an inner ring 13, cylindrical rollers 15, and a cage 17, and the inner ring 13 includes an inner ring raceway surface 13a that is in contact with the cylindrical rollers 15, an inner ring flange portion 19 that is formed on one side in a width direction of the inner ring raceway surface 13a, that is, on an end portion on one side in an axial direction (a right end in FIG. 1) and protrudes toward the outer ring 11, and inner ring side surfaces 25a, 25b.

The outer ring 11 has an outer ring raceway surface 11a that is in contact with the cylindrical rollers 15, outer ring flange portions 12a, 12b that are formed on both sides of the outer ring raceway surface 11a in the width direction and protrude toward the inner ring 13, and outer ring side surfaces 16a, 16b.

The cylindrical roller 15 has a roller outer circumferential surface 15b that is in rolling contact with the outer ring raceway surface 11a and the inner ring raceway surface 13a, and roller end surfaces 15a.

The inner ring flange portion 19 has a guide surface 19a that guides the cylindrical rollers 15 in a circumferential direction of the outer ring 11 and the inner ring 13. The cylindrical rollers 15 roll on the inner ring raceway surface 13a with the roller end surfaces 15a in sliding contact with the guide surface 19a of the inner ring flange portion 19.

Figure 2:
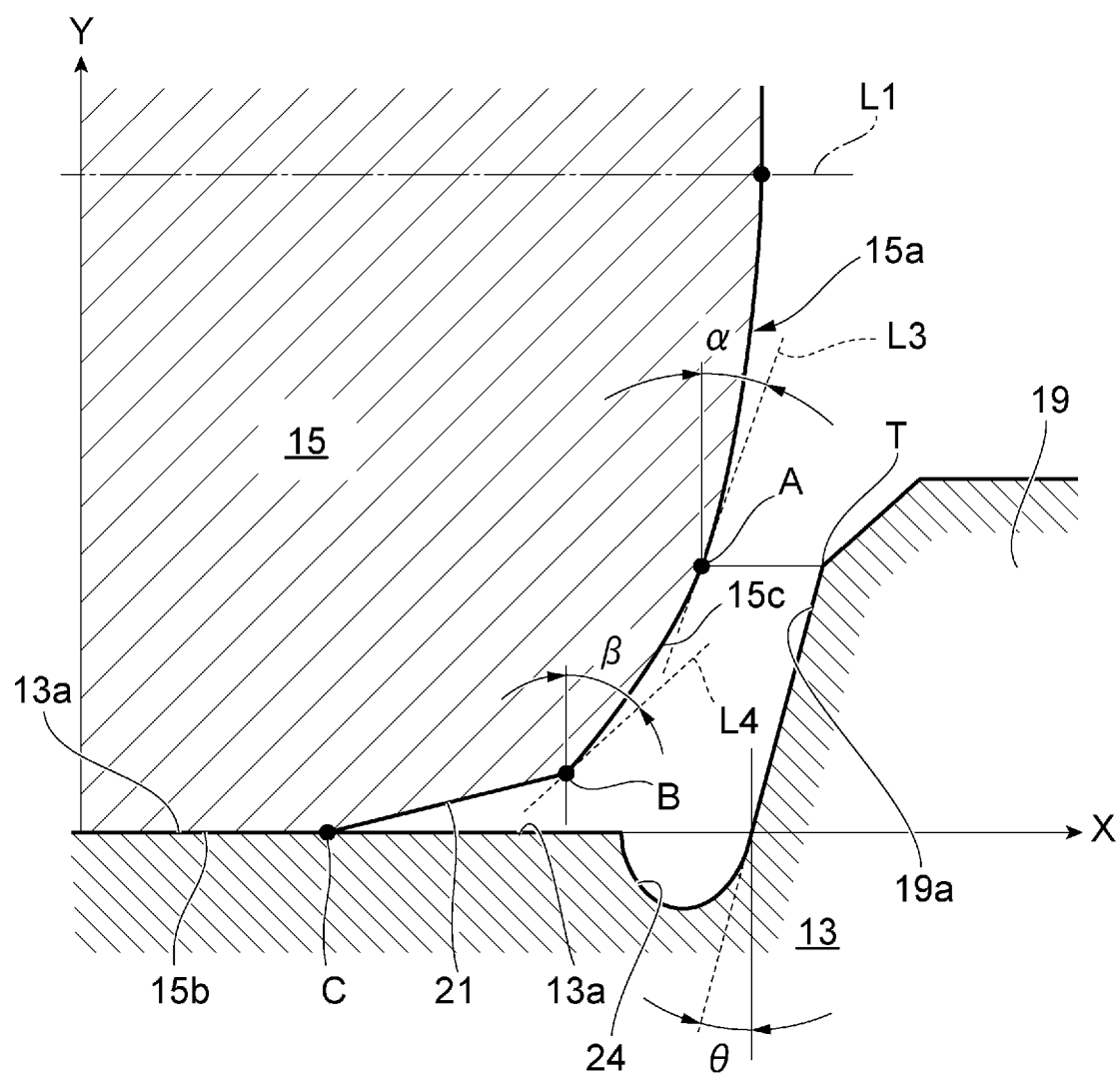
FIG. 2 is an enlarged view of a portion S in FIG. 1, and is a partially enlarged view illustrating a state in which a cylindrical roller and a flange portion are separated from each other.

FIG. 2 is an enlarged view of a portion S in FIG. 1, and is a partially enlarged view illustrating a state in which the cylindrical roller 15 and the inner ring flange portion 19 are separated from each other. FIG. 2 shows a cross section taken along a plane including a rotation axis L1 of the cylindrical roller 15 and a bearing central axis L2, in which an X direction is the axial direction and a Y direction is a radial direction. In the figure, T indicates an intersection point between the chamfered portion (chamfer) of the inner ring flange portion 19 and the guide surface 19a.

The inner ring flange portion 19 has the guide surface 19a that guides the cylindrical rollers 15 in the circumferential direction of the outer ring 11 and the inner ring 13 shown in FIG. 1. The guide surface 19a is an annular surface continuous along the circumferential direction.

The roller end surface 15a of the cylindrical roller 15 is provided with a chamfered portion (chamfer) 21 whose diameter is reduced from one end of the roller outer circumferential surface 15b along the rotation axis L1 so as to be separated from the inner ring raceway surface 13a, and a roller inclined surface 15c which is formed from an axially outer side end portion of the chamfered portion 21 toward a radially inner side of the roller end surface 15a and faces the guide surface 19a of the inner ring flange portion 19.

The roller end surface 15a of the cylindrical roller 15, which is in sliding contact with the inner ring flange portion 19, is formed by grinding with an elastic grinding stone (not shown).

Surface roughness Ra of the roller inclined surface 15c is preferably 0.1 μm or less, more preferably 0.05 μm or less, and still more preferably 0.03 μm or less. Accordingly, friction between the roller inclined surface 15c and the guide surface 19a of the inner ring flange portion 19 can be reduced, an oil film formability is improved, and an allowable rotational speed of the roller bearing 100 can be improved. In addition, it is also advantageous for improvement of seizure resistance and galling.

Here, in the cross section shown in FIG. 2, a radial position of the roller inclined surface 15c corresponding to the end portion T of the guide surface 19a on a flange portion protruding side is defined as a first position A, and a radial position of the roller inclined surface 15c corresponding to a boundary between the chamfered portion 21 and the roller inclined surface 15c is defined as a second position B. Here, "corresponding to" means being at the same position in the radial direction. A position of an axial end of the chamfered portion 21 opposite the second position B is set as a third position C.

An intersection angle between a tangent line L3 of the roller inclined surface 15c at the first position A and a perpendicular line of the rotation axis L1 of the cylindrical roller 15 is defined as α, an intersection angle between a tangent line L4 of the roller inclined surface 15c at the second position B and a perpendicular line of the rotation axis L1 of the cylindrical roller 15 is defined as β, and an intersection angle between the guide surface 19a and a perpendicular line of the bearing central axis L2 (see FIG. 1) (here, the same as the perpendicular line of the rotation axis L1 of the cylindrical roller 15) is defined as θ. θ is equal to a flange opening angle of the inner ring flange portion 19.

It is assumed that the intersection angle θ of the guide surface 19a is manufactured by setting θ±δ as a target value with an allowable tolerance during manufacturing of the inner ring 13 as ±δ. As a value of δ representing the allowable range, for example, a value of 5', 3', (2'), or the like is adopted according to various conditions such as a standard, use, and size of the bearing.

At this time, the intersection angle α at the first position A and the intersection angle β at the second position B are set as in Equation (1), preferably Equation (2).

$$\alpha < \theta < \beta \quad (1)$$

$$(\alpha + \delta) < \theta < (\beta - \delta) \quad (2)$$

As described above, by determining a shape of the roller inclined surface 15c using the intersection angle α at the first position A and the intersection angle β at the second position B, a contact point at which the guide surface 19a of the inner ring flange portion 19 comes into contact with the roller inclined surface 15c of the cylindrical roller 15 falls between the first position A and the second position B.

Hereinafter, specific description will be made. For example, it is assumed that an allowable tolerance of the intersection angle θ=20' of the guide surface 19a of the inner ring flange portion 19 is ±3', when the intersection angle θ is 20', the intersection angle α at the first position A is set to be equal to or less than 20', the intersection angle β at the second position B is set to be larger than 20' based on Equation (1), and preferably, the intersection angle α at the first position A is set to be less than 17' (=20'−3'), and the intersection angle β at the second position B is set to be larger than 23' (=20'+3') based on Equation (2).

Thus, when the contact point between the guide surface 19a of the inner ring flange portion 19 and the roller end surface 15a of the cylindrical roller 15 is the first position A, the roller end surface 15a has an inclination less than a minimum allowable value of the inclination of the guide surface 19a, and thus the contact point does not move inward in the radial direction of the roller from the first position A. In addition, when the contact point is the second position B, the roller end surface 15a has an inclination larger than a maximum allowable value of the guide surface 19a, and thus the contact point does not move outward in the radial direction of the roller from the second position B. Therefore, the contact point between the guide surface 19a and the roller end surface 15a falls within a range from the first position A to the second position B on the roller end surface 15a. That is, an annular range of the roller end surface 15a from the first position A to the second position B serves as an effective contact surface with the inner ring flange portion 19.

In this way, edge contact does not occur between the roller end surface 15a and the guide surface 19a of the inner ring flange portion 19. Even if an edge is present at an intersection point between the roller end surface 15a and the chamfered portion (chamfer) 21, edge contact with the guide surface 19a of the inner ring flange portion 19 due to skew or the like does not occur. Therefore, occurrence of rapid heat generation due to rapid edge load can be prevented.

In addition, as shown in FIG. 2, a gap between the inner ring flange portion 19 and the cylindrical roller 15 increases toward a radially inner side of the roller (on a radially outer side of the inner ring flange portion 19) from the first position A, and a gap between the inner ring flange portion 19 and the cylindrical roller 15 also increases toward a radially outer side of the roller (on a radially inner side of the inner ring flange portion 19) from the second position B. Therefore, lubricating oil (and grease) in the bearing is smoothly sucked. Therefore, at the actual contact point in the effective contact surface from the first position A to the second position B, the edge load does not occur and the surface pressure decreases. As a result, a configuration having sufficient lubrication performance and an excellent cooling effect can be obtained.

The inner ring flange portion 19 shown here does not have a grinding recess portion in the axial direction, and the roller end surface 15a has a so-called surface-smooth shape having a large crowning amount and continuity. For the grinding recess in FIG. 2, a grinding recess portion 24 is provided on the inner ring raceway surface 13a at a position from an assumed point at which the inner ring raceway surface 13a extending along the bearing central axis L2 (FIG. 1) of the inner ring 13 and the guide surface 19a of the inner ring flange portion 19 abut against each other to the third position C at the maximum. The grinding recess portion 24 is preferably formed between an intersection point (not shown) at which the inner ring raceway surface 13a abuts against the guide surface 19a of the inner ring flange portion 19 and the point C on the inner ring raceway surface 13a (preferably, closer to the intersection point than to the point C). The grinding recess portion 24 is preferably formed by turning (hard patterning) after heat treatment.

In the above-described configuration, the inner ring flange portion 19 is provided on the inner ring 13, but the flange portion is not limited to the inner ring 13, and may be a flange portion formed on the outer ring 11.

In the case where the flange portion is formed on the inner ring 13, the first position A and the second position B are disposed at positions from the intersection point where the flange chamfered portion and the guide surface are in contact with each other to a small diameter side of the bearing.

In a case where the flange portion is formed on the outer ring 11, the first position A and the second position B are disposed at positions from the intersection point where the flange chamfered portion and the guide surface are in contact with each other to a large diameter side of the bearing.

In either case, in the roller 15, the first position A is on a small diameter side of the roller inclined surface, and the second position B is on a large diameter side of the roller inclined surface.

Further, the second position B where the roller inclined surface 15c and the chamfered portion 21 are connected to each other is formed by a smooth curved surface without an edge. The connecting portion generally has an edge at the intersection point between the roller inclined surface 15c whose axial cross section is formed by a curved line and the chamfered portion 21 formed by a straight line, but in this configuration, the connecting portion is continuously formed as a smooth curved surface without an edge. Such a curved surface without an edge can be formed into, for example, a spline curve, or a Bezier curve. Examples of a joining process for processing the connection portion include grinding with an elastic grinding stone, but the present invention is not limited thereto. Therefore, the edge contact does not occur, and rapid heat generation of the roller bearing 100 due to edge load can be prevented.

<Apply Axial Pre-Load>

In the roller bearing 100 of the present configuration, generation of the squeaking sound due to applying an axial pre-load to the bearing can be effectively prevented.

Generally, in a roller bearing, there is a part (non-load zone) in the bearing that is not loaded, but in the roller bearing 100 of the present configuration, an axial pre-load is applied such that a predetermined load is received by all of the cylindrical rollers 15 arranged in the non-load zone. That is, the axial pre-load is applied in the axial direction to a side surface (outer ring side surface 16a) of the outer ring 11 on one side and a side surface (inner ring side surface 25b) of the inner ring 13 on the other side among side surfaces of the outer ring 11 and the inner ring 13 on the one side and the other side. Then, the cylindrical rollers 15 are restrained, and a behavior of the cylindrical rollers 15 is restricted. Accordingly, the roller bearing 100 can be obtained in which the generation of squeaking sound can be prevented and a rotational operation can be performed while maintaining a silent state.

<Cylindrical Roller Bearing Unit>

Next, a roller bearing unit 200 capable of preventing the generation of squeaking sound by using the above roller bearing 100 will be described.

Figure 3:
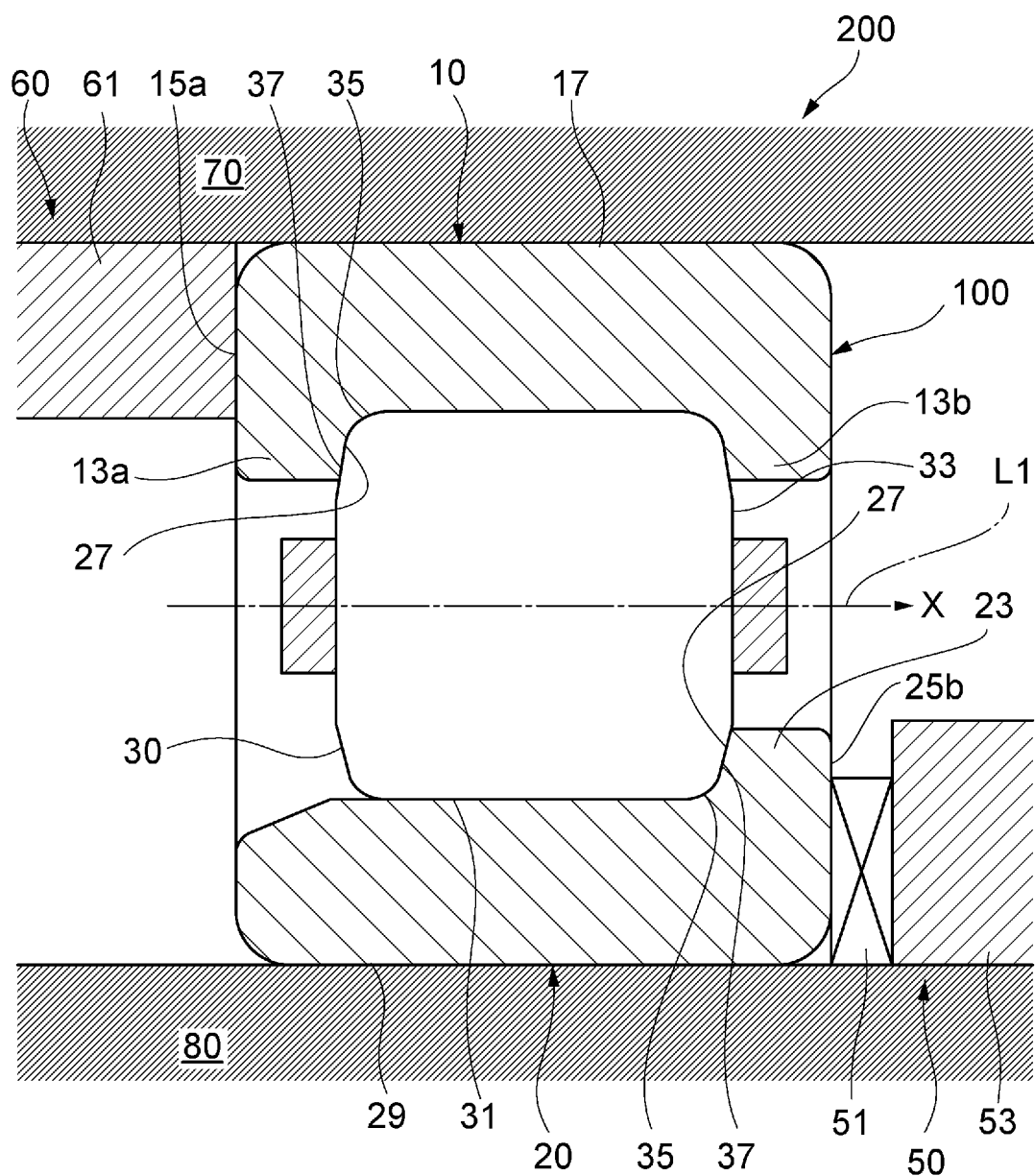
FIG. 3 is a schematic cross-sectional view of a main part of a roller bearing unit including the roller bearing of FIG. 1.

FIG. 3 is a schematic cross-sectional view of a main part of the roller bearing unit 200 including the roller bearing 100 of FIG. 1.

The roller bearing unit 200 includes the roller bearing 100, a pre-load unit 50, and a regulation portion 60.

One of the pre-load unit 50 and the regulation portion 60 is disposed on a housing 70 side, and the other is disposed on a shaft 80 side. FIG. 3 shows a configuration in which the regulation portion 60 is disposed on the housing 70 side and the pre-load unit 50 is disposed on the shaft 80 side, but the regulation portion 60 may be disposed on the shaft 80 side and the pre-load unit 50 may be disposed on the housing 70 side. Further, the pre-load unit 50 and the regulation portion 60 may be disposed on the housing 70 side, as to be described later. That is, the pre-load unit 50 and the regulation portion 60 may be disposed at diagonal positions in a cross section in an axial direction X.

An outer ring fixing ring 61, which is the regulation portion 60 and is abutted against an outer circumferential surface 18 of the outer ring 11 and the outer ring side surface 16a (left side in FIG. 3) of the outer ring 11 is fixed to a housing 70 shown in FIG. 3. The outer ring fixing ring 61 may be an annular member, or may be a wall portion protruding from the housing 70 toward the inner ring 13. The outer ring fixing ring 61 prevents axial displacement of the outer ring 11 by applying an axial pre-load to be described later.

An inner circumferential surface 29 of the inner ring 13, a spring portion 51 that is abutted against the inner ring side surface 25b (right side in FIG. 3) of the inner ring 13, and an inner ring fixing ring 53 that presses the spring portion 51 toward the inner ring side surface 25b are disposed on a shaft 80. The inner ring fixing ring 53 may be configured to be screwed to the shaft 80, or may be a stepped portion of the shaft 80 itself that protrudes radially outward. The spring portion 51 and the inner ring fixing ring 53 constitute the pre-load unit 50. The pre-load unit 50 presses the inner ring side surface 25b of the inner ring flange portion 19 to apply an axial pre-load to the roller bearing 100. The pre-load unit 50 may have another configuration as long as the pre-load unit 50 can press the inner ring side surface 25b in the axial direction. The axial pre-load can be changed to an appropriate pre-load by changing an elastic constant of the spring portion 51 or a degree of screwing of the inner ring fixing ring 53.

The housing 70 is a housing that is disposed to cover the roller bearing 100 and positions the cylindrical roller bearing 100 at a predetermined position, and examples of the housing 70 includes a plummer block, a wheel box, or a motor case.

According to the roller bearing unit 200 configured as described above, the shaft 80 and the housing 70 can be supported by the roller bearing 100 so as to be rotatable relative to each other, and an axial pre-load can be applied to the roller bearing 100. Thus, as described above, the roller bearing 100 to which the axial pre-load is applied can prevent the generation of squeaking sound.

As the pre-load unit 50, any one of a constant-pressure pre-load mechanism and a constant-position pre-load mechanism can be applied. When the pre-load is applied via a constant pre-load mechanism such as a spring, a constant pre-load can be secured even when an inside of the roller bearing 100 is worn, so that the constant pre-load mechanism is preferable.

<Motor>

Figure 4:
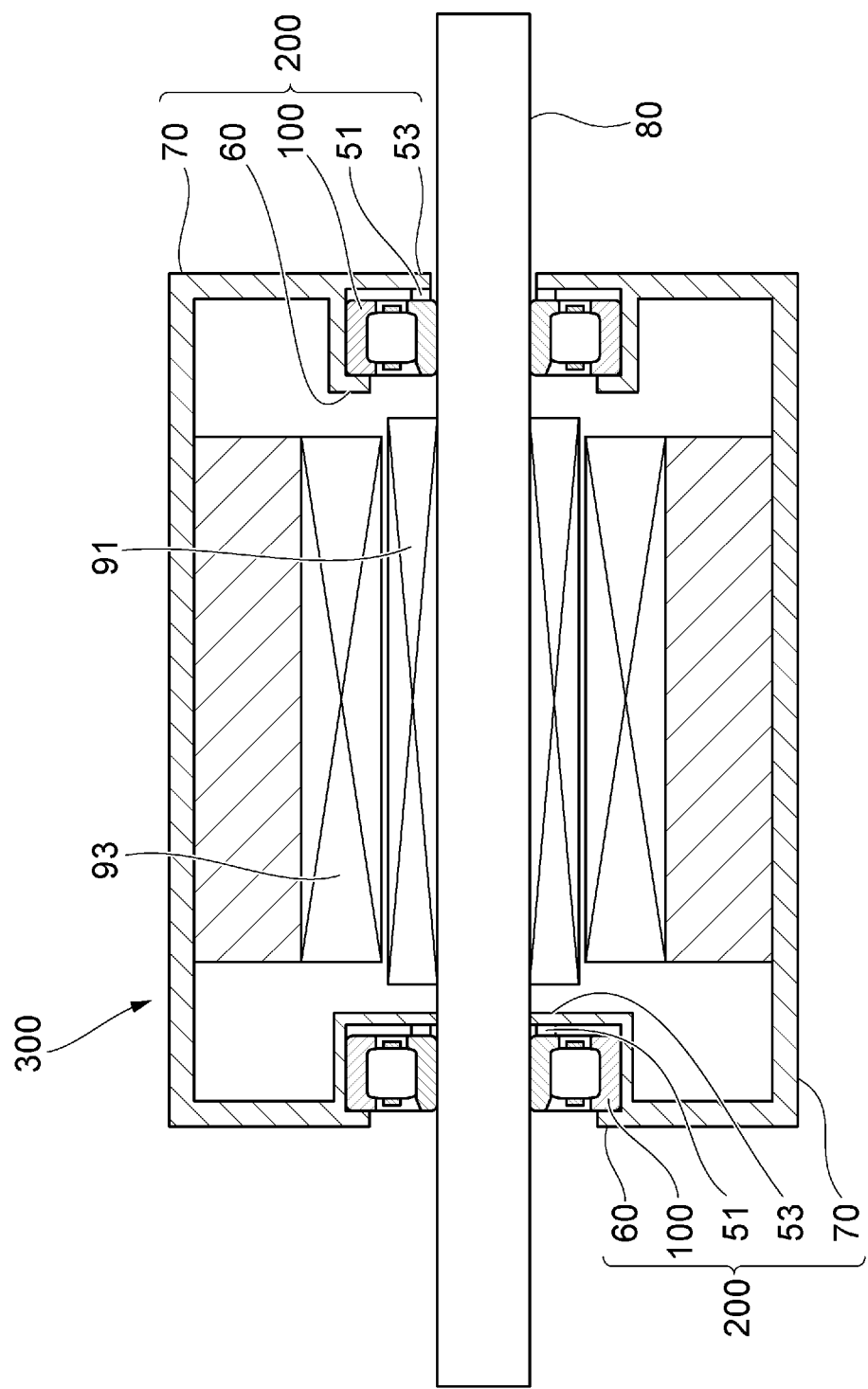
FIG. 4 is a schematic cross-sectional view of a motor in which the roller bearing shown in FIG. 1 and the roller bearing unit shown in FIG. 3 are applied to support a motor rotating shaft.

FIG. 4 is a schematic cross-sectional view of a motor 300 in which the roller bearing 100 shown in FIG. 1 and the roller bearing unit 200 shown in FIG. 3 are applied to support a motor rotating shaft.

The motor 300 includes the housing 70, the shaft 80 that passes through the housing 70 and rotates, a rotor 91 that is fixed to the shaft 80, a stator 93 that surrounds the rotor 91 and is fixed to the housing 70, and at least a pair of roller bearing units 200 that support the shaft 80 on the housing 70.

According to the motor 300 of this configuration, an axial pre-load is applied to the roller bearing 100 by using the roller bearing 100 described above, thus the generation of squeaking sound can be prevented and quiet operation is possible.

EMBODIMENT

Hereinafter, specific examples of a shape of the roller end surface and a shape of the guide surface of the flange portion will be described.

First Configuration Example

Figure 5:
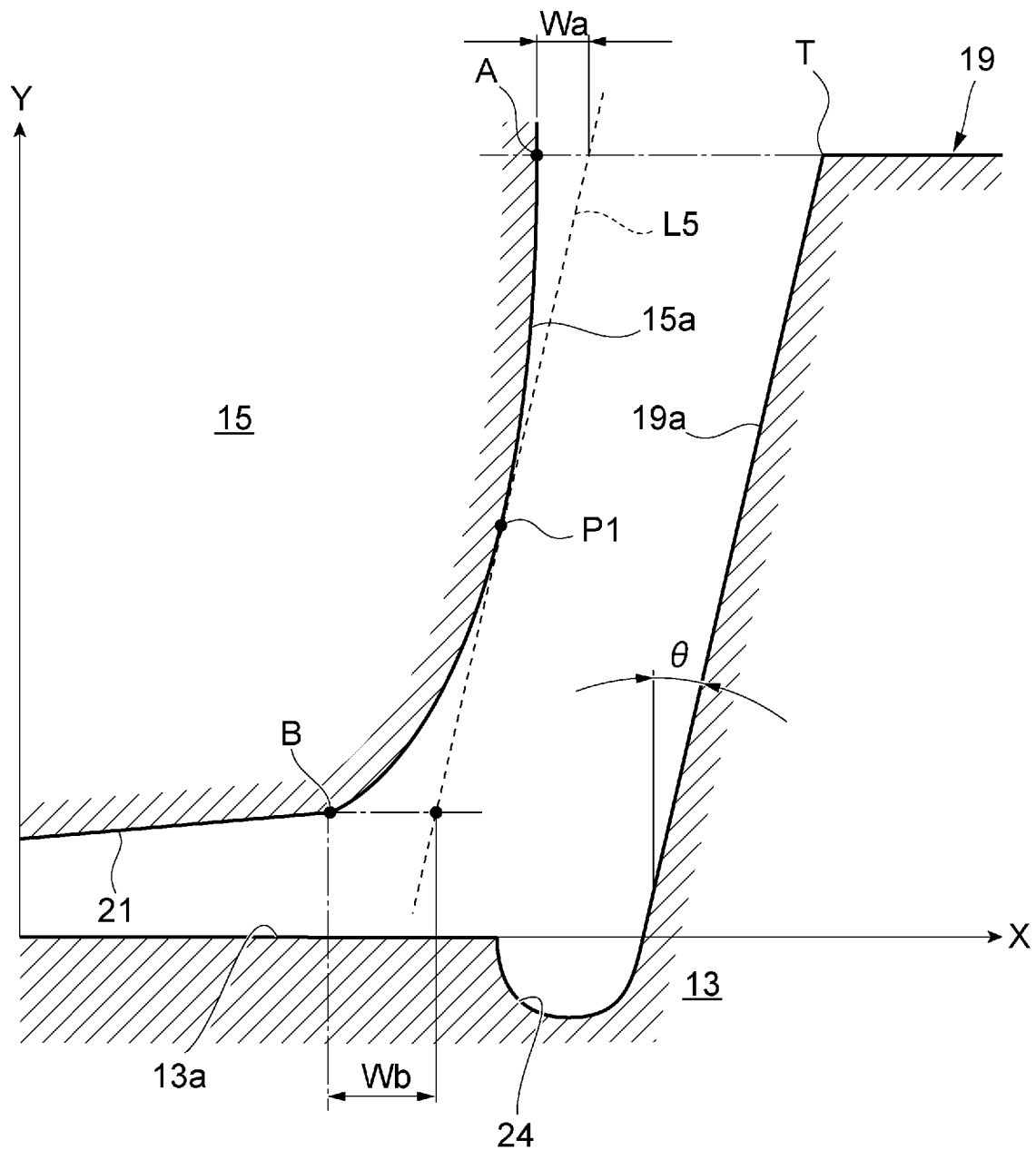
FIG. 5 is an enlarged cross-sectional view showing a flange portion and a cylindrical roller in a first configuration example.

FIG. 5 is an enlarged cross-sectional view showing the inner ring flange portion 19 and the cylindrical roller 15 in a first configuration example.

In the first configuration example, the grinding recess portion extending in the axial direction is not formed in an end portion of the guide surface 19a on an inner ring raceway surface side, the grinding recess portion 24 extending in the radial direction is provided in an end portion of the inner ring raceway surface 13a, and the roller end surface 15a has a continuous shape having a large crowning amount.

The cylindrical roller bearing 100 manufactured by setting the allowable range of the intersection angle θ in the guide surface 19a of the inner ring flange portion 19 to 20'±3' was prepared, and an outer shape of the cylindrical roller 15 was measured. In particular, coordinates of the roller end surface 15a at a certain point P1 between the first position A and the second position B of the roller end surface 15a were measured, and an inclination of a tangent line L5 (change in amount of fall per 0.1 mm in the axial direction) was calculated based on the obtained coordinates.

Figure 6:
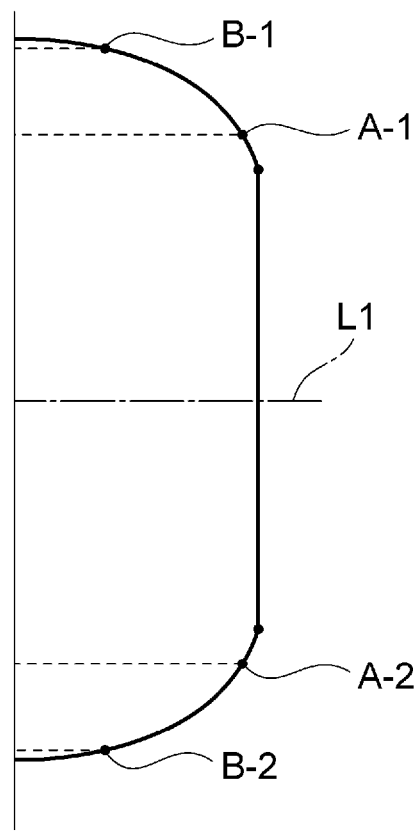
FIG. 6 is a schematic view schematically showing a result of measuring a shape of an end surface of the cylindrical roller in the first configuration example.

FIG. 6 is a schematic view schematically showing a result of measuring an end surface shape of the cylindrical roller in the first configuration example. In FIG. 6, a rotation axis of the cylindrical roller is indicated by L1. As a result of calculating the inclination of the tangent line based on the measurement result of the outer shape of the end surface of the cylindrical roller, an inclination of a tangent line at a first position A-1 (a position corresponding to A in FIG. 5) on one roller end surface in the pair of roller end surfaces was 9.5', an inclination α of a tangent line at a first position A-2 (a position corresponding to A in FIG. 5 and on an 180° opposite phase side of A-1) on the same roller end surface was 10.1', and the inclination of the tangent line was less than 20' and less than 17' at any position. As a matter of course, an inclination of a tangent line is also less than 20' and less than 17' at positions A-1 and A-2 on an opposite end surface of the roller.

An inclination β of a tangent line at a second position B-1 (corresponding to B in FIG. 5) on the one roller end surface was 66.6', an inclination of a tangent line at a second position B-2 (corresponding to B in FIG. 5) (180° opposite phase side of B1) on the same roller end surface was 86.7', and the inclination of the tangent line was larger than 20' and larger than 23' at any position. As a matter of course, an inclination of a tangent line is also larger than 23' at positions B-1 and B-2 on an opposite end surface of the roller.

In the first configuration example, between the first position A-1 and the second position B-1, and between the first position A-2 and the second position B-2, where a contact point between the roller end surface 15a and the guide surface 19a of the inner ring flange portion 19 is obtained, the inclination is within the allowable range of the inclination of the guide surface 19a. Therefore, an radially inner side of the first positions A-1 and A-2 and an radially outer side of the second positions B-1 and B-2 of the roller end surface 15a cannot serve as the contact point with the guide surface 19a. Therefore, the roller end surface 15a does not come into edge contact with the guide surface 19a, and the intersection point between the roller end surface 15a and the chamfered portion 21 (chamfer) does not come into contact with the guide surface 19a even when a skew or the like occurs. As a result, heat generation due to a rapid edge load does not occur.

As shown in FIG. 5, a gap Wa between the inner ring flange portion 19 and the cylindrical roller 15 at the first position A and a gap Wb between the inner ring flange portion 19 and the cylindrical roller 15 at the second position B are both large, and the lubricating oil (and grease) in the bearing is smoothly sucked.

Second Configuration Example

Figure 7:
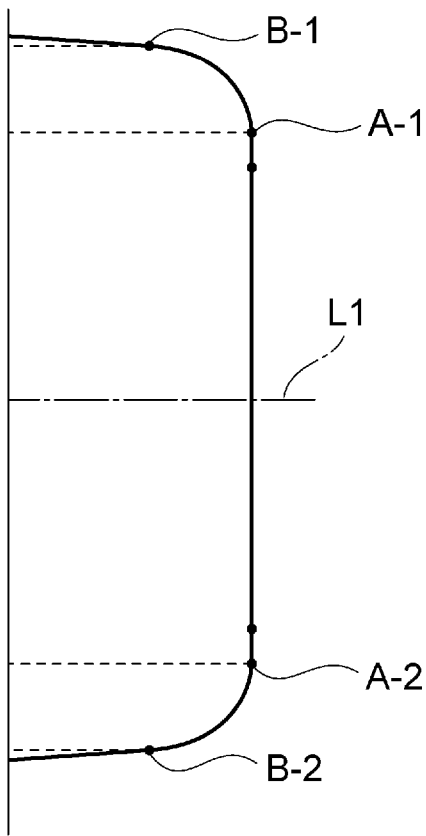
FIG. 7 is a schematic view schematically showing a result of measuring a shape of an end surface of a cylindrical roller in a second configuration example.

FIG. 7 is a schematic view schematically showing a result of measuring a shape of a cylindrical roller in a second configuration example. In FIG. 7, the rotation axis of the cylindrical roller 15 is indicated by L1.

The roller end surface 15a in the second configuration example has a continuous tapered shape as in the first configuration example shown in FIG. 6, but crowning of the roller end surface 15a is small.

An outer shape of the cylindrical roller 15 manufactured by setting the allowable range of the intersection angle θ in the guide surface 19a of the inner ring flange portion 19 to 20'±3' was measured.

As a result of calculating an inclination of a tangent line based on the measurement result of the outer shape, an inclination α of a tangent line at the first position A-1 on one roller end surface in the pair of roller end surfaces was 1.3', an inclination of a tangent line at the first position A-2 (180° opposite phase side of A-1) on the same roller end surface was 0.7', and the inclination of the tangent line was less than 17' at any position. As a matter of course, an inclination of a tangent line is also less than 20' and less than 17' at positions A-1 and A-2 on an opposite end surface of the roller.

Further, an inclination β of a tangent line at the second position B-1 on the one roller end surface was 98.6', an inclination of a tangent line at the second position B-2 (180° opposite phase side of B-1) on the same roller end surface was 104.5', and the inclination of the tangent line was larger than 20' and larger than 23' at any position. As a matter of course, an inclination of a tangent line is also larger than 20' and larger than 23' at positions B-1 and B-2 on an opposite end surface of the roller.

In the second configuration example, similarly to the first configuration example, the roller end surface 15a does not come into edge contact with the guide surface 19a, and the intersection point between the roller end surface 15a and the chamfered portion 21 (chamfer) does not come into contact with the guide surface 19a even when a skew or the like occurs, so that heat generation due to a rapid edge load does not occur. In addition, the gap Wa and the gap Wb are both large, and the lubricating oil (and grease) in the bearing is smoothly sucked.

Third Configuration Example

Figure 8:
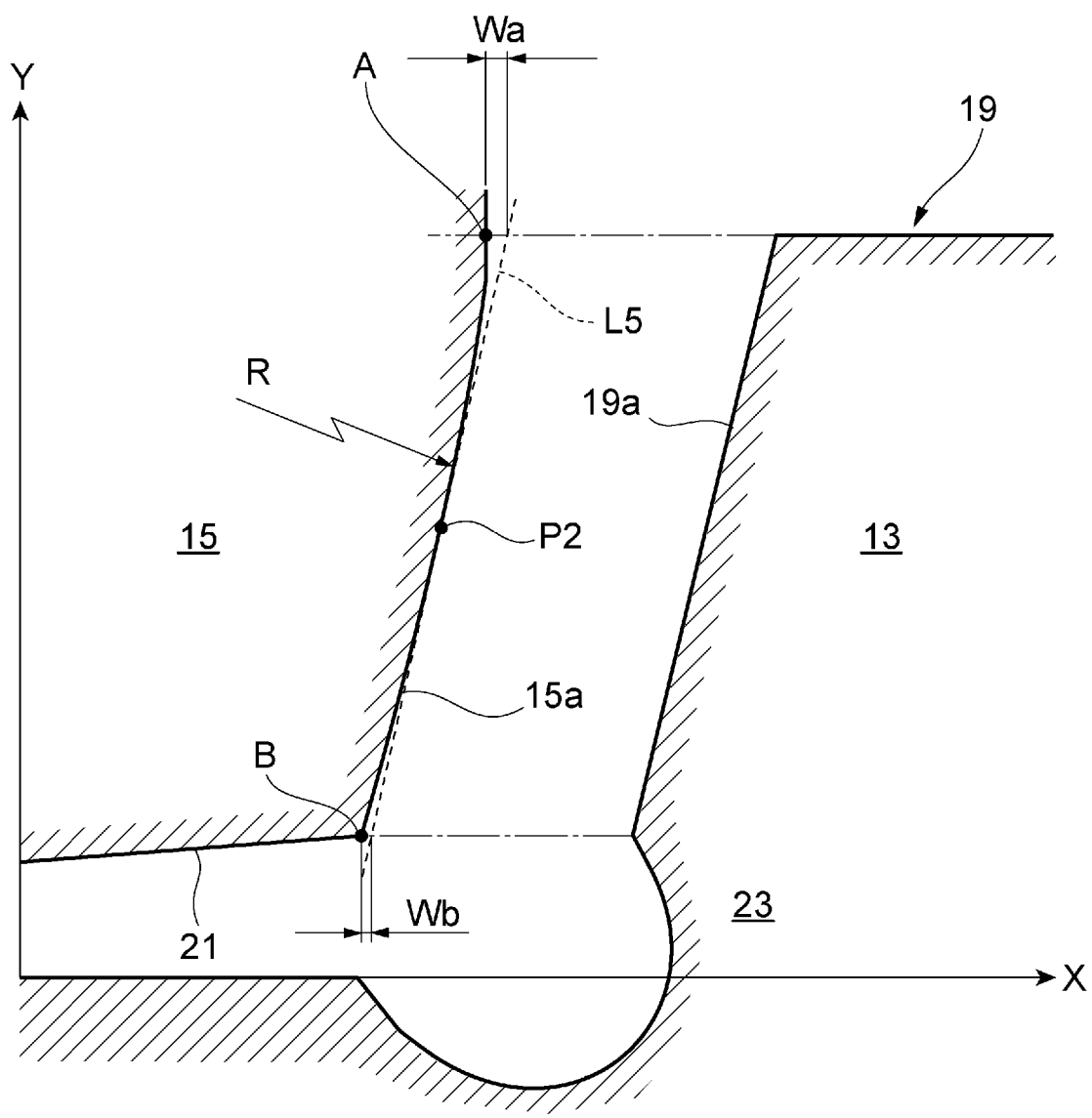
FIG. 8 is a cross-sectional view showing a flange portion and a cylindrical roller in a third configuration example.

FIG. 8 is a cross-sectional view showing the inner ring flange portion 19 and the cylindrical roller 15 in a third configuration example.

The roller end surface 15a in the third configuration example is a grinding surface formed with a radius of curvature R of 3000 mm, and a grinding recess portion 23 extending in the axial direction is formed at a base end of the inner ring flange portion 19. In this configuration, an intermediate point P2 of the roller end surface 15a comes into contact with the guide surface 19a of the inner ring flange portion 19. A relationship among the intersection angle α, the intersection angle β, and the intersection angle θ is α<θ<β, but since the radius of curvature R of the roller end surface 15a is larger than those in the first and second configuration examples, the gap Wa at the first position A and the gap Wb at the second position B are smaller than those in the first and second configuration examples.

Fourth Configuration Example

Figure 9:
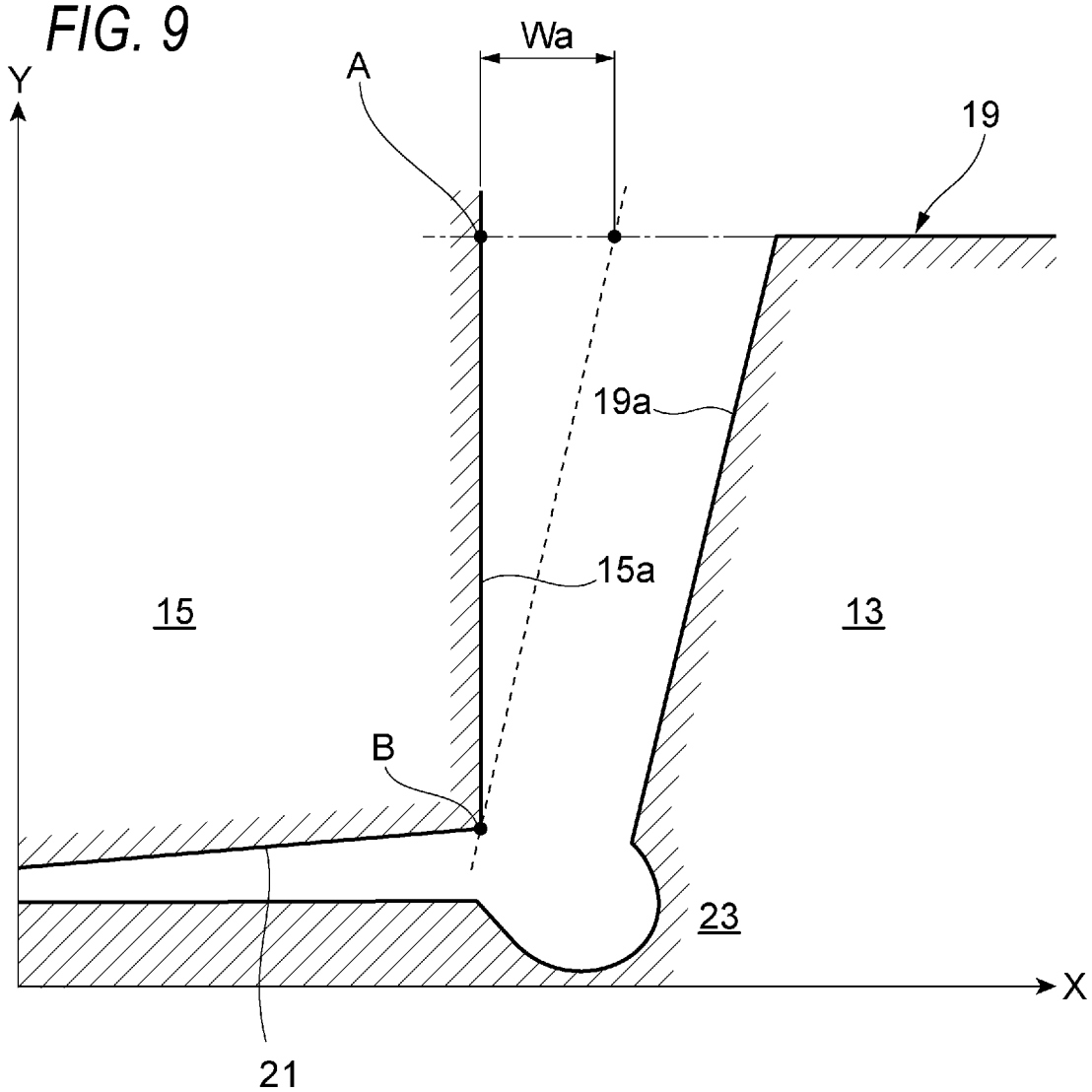
FIG. 9 is a cross-sectional view showing a flange portion and a cylindrical roller in a fourth configuration example.

FIG. 9 is a cross-sectional view showing the inner ring flange portion 19 and the cylindrical roller 15 in a fourth configuration example.

The roller end surface 15a in the fourth configuration example is a flat grinding surface, and a relationship among the intersection angle α, the intersection angle β, and the intersection angle θ is α<β and β<θ. A grinding recess portion 23 extending in the axial direction is formed at a base end of the inner ring flange portion 19. In this configuration, the second position B of the roller end surface 15a comes into contact with the guide surface 19a of the inner ring flange portion 19. In addition, the gap Wa at the first position A is larger than those in the first to third configuration examples, but there is no gap at the second position B.

<Performance Test Results>

A roller bearing in which cylindrical rollers having the same shapes as those of the first configuration example and the second configuration example described above were incorporated into a bearing ring of a cylindrical roller bearing NJ2326 (inner diameter: 130 mm, outer diameter: 280 mm), and roller bearings corresponding to the third configuration example and the fourth configuration example were prepared, and a performance test of each roller bearing was performed.

(Test Conditions)
  Radial load Fr: apply a load of 90487 N (9224 kgf)
  Axial load Fa: apply a load from 0.1×Fr to 0.6×Fr (radial load)
  Rotational speed N: 1000 min$^{-1}$
  Oil bath lubrication (viscosity: VG68, 500 cc=amount of oil surface at lowermost portion of roller PCD)
  Load application time: 10 hours (or more)
  Manufacturing allowable range of the angle of the guide surface of the inner ring flange portion: 20'±3' (δ=3')
  Test Example A1: the cylindrical rollers in the first configuration example+the bearing ring of the cylindrical roller bearing NJ2326
  Test Example A2: the cylindrical rollers in the second configuration example+the bearing ring of the cylindrical roller bearing NJ2326
  Test Example A3: the cylindrical rollers in the third configuration example+the bearing ring of the cylindrical roller bearing NJ2326
  Test Example A4 (Comparative Example A4): the cylindrical rollers in the fourth configuration example+the bearing ring of the cylindrical roller bearing NJ2326

The grinding recess portions 24 in Test Example A1 and Test Example A2 were formed by turning after heat treatment, and the grinding recess portions 23 in Test Example A3 and Comparative Example A4 were formed by turning before heat treatment.

Figure 10:
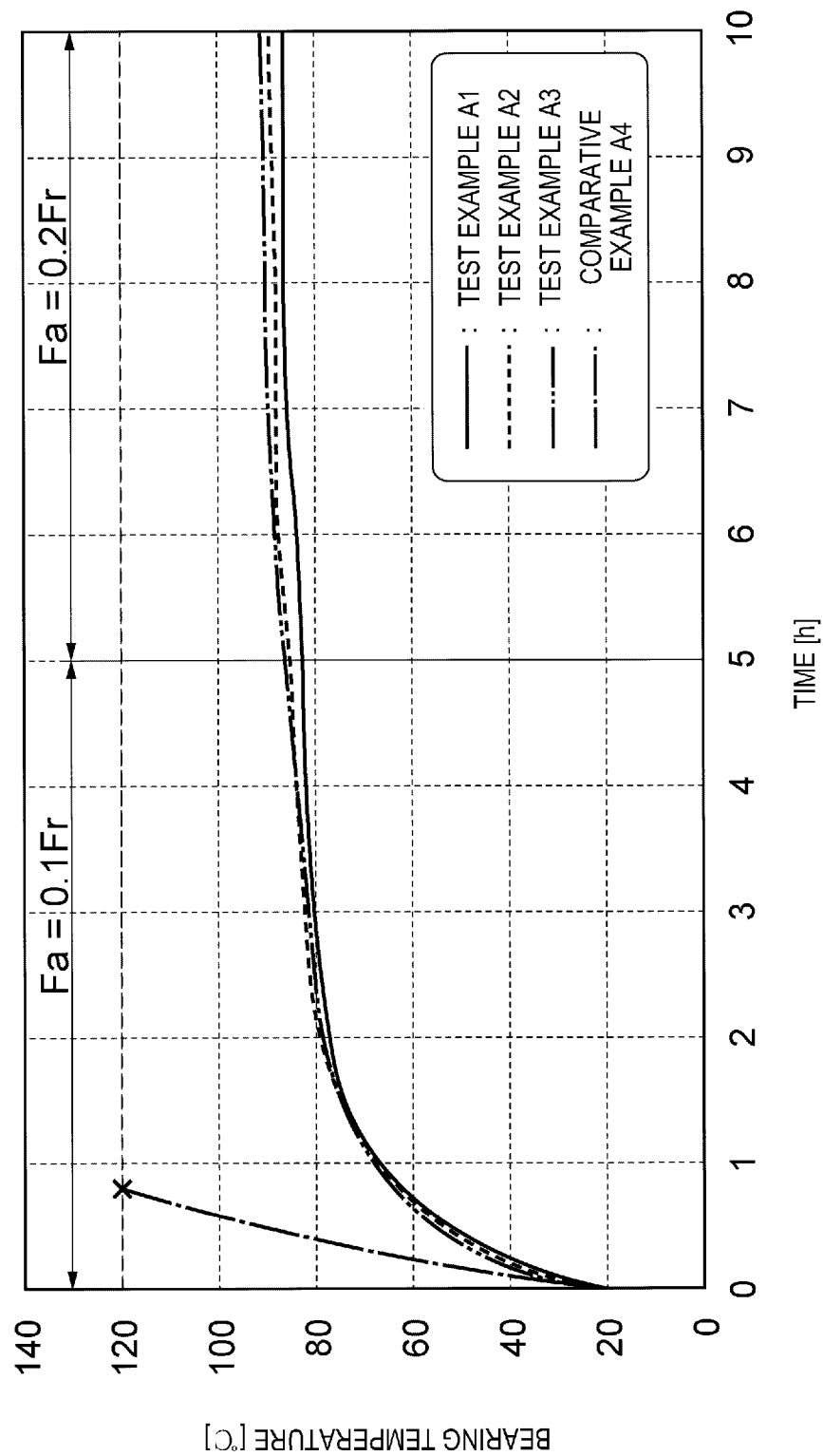
FIG. 10 is a graph showing results of performance tests and showing a transition of a bearing outer ring temperature with respect to an elapsed time.
Figure 11:
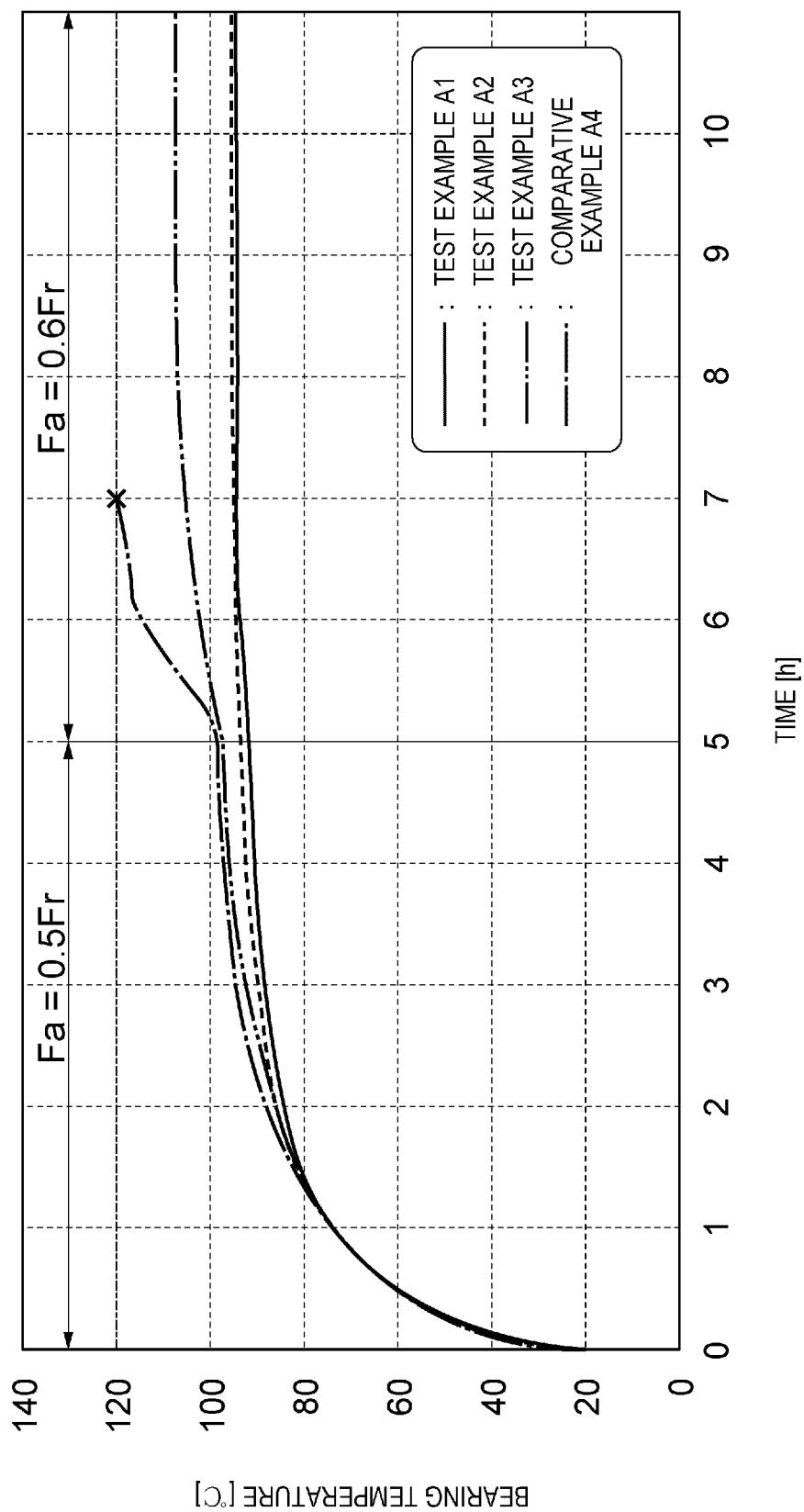
FIG. 11 is a graph showing results of performance tests and showing a transition of a bearing outer ring temperature with respect to an elapsed time.

FIGS. 10 and 11 are graphs showing results of the performance tests and showing a transition of a bearing outer ring temperature with respect to an elapsed time. FIG. 10 shows a result in a case where the radial load is constantly applied and the axial load is increased to 0.2×Fr after being set to 0.1×Fr, and FIG. 11 shows a result in a case where the radial load is constantly applied and the axial load is increased to 0.6×Fr after being set to 0.5×Fr.

When the axial load shown in FIG. 10 was small, Test Example A1 to Test Example A3 showed almost the same tendency until 3 hours elapsed from the start of the test, but after 4 hours elapsed, a difference between Test Example A1 and Test Examples A2 and A3 appeared, and the bearing temperature of Test Example A1 was the lowest. The bearing temperature after 5 hours elapsed was 81.8° C. in Test Example A1, was 84.8° C. in Test Example A2, and was 85.8° C. in Test Example A3. After 10 hours elapsed, the bearing temperature was 85.9° C. in Test Example A1, was 89.0° C. in Test Example A2, and was 90.6° C. in Test Example A3.

On the other hand, in Comparative Example A4, the bearing temperature rapidly increased from the start of the test, and reached 120° C. before one hour elapses.

The results when the axial load shown in FIG. 11 is large are shown, and the bearing specifications are shown below.
  Test Example A1: the cylindrical rollers in the first configuration example+the bearing ring of the cylindrical roller bearing NJ2326
  Test Example A2: the cylindrical rollers in the second configuration example+the bearing ring of the cylindrical roller bearing NJ2326
  Test Example A3: the cylindrical rollers in the third configuration example+the bearing ring of the cylindrical roller bearing NJ2326
  Comparative Example A4: the cylindrical rollers in the third configuration example+the bearing ring of the cylindrical roller bearing NJ2326

The grinding recess portions 24 in Test Example A1 and Test Example A2 were formed by turning after heat treatment, and the grinding recess portions 23 in Test Example A3 and Comparative Example A4 were formed by turning before heat treatment. In Test Example A1 to Comparative Example A4, there was almost no difference until 1.5 hours elapsed, but thereafter, the bearing temperature was increased in order of Test Example A1, Test Example A2, Test Example A3, and Comparative Example A4. Then, when the axial load was increased to 0.6×Fr after 5 hours lapsed, a difference between Comparative Example A4 and Test Examples A1 and A2 was increased, and in Comparative Example A4, the bearing temperature rapidly increased and reached 120° C. after 7 hours lapsed. The bearing temperature after 5 hours elapsed was 91.7° C. in Test Example A1, was 93.8° C. in Test Example A2, was 97.8° C. in Test Example A3, and was 98.2° C. in Comparative Example A4. After 10 hours elapsed, the bearing temperature was 94.4° C. in Test Example A1, was 95.9° C. in Test Example A2, and was 107.5° C. in Test Example A3.

As described above, the axial resistance performance can be improved regardless of the amount of crowning on the roller end surface by setting the shape of the roller end surface such that the inclinations at the first position A and the second position B is set to α<θ<β, preferably, the inclination at the first position A is set to an inclination less than a minimum manufacturing allowable value (θ−δ) of the guide surface of the flange portion, the inclination at the second position B is set to an inclination larger than a maximum manufacturing allowable value (θ+δ) of the guide surface of the flange portion, and the roller end surface is formed to have a continuous outline at any position.

Surface roughness Ra of the roller end surface in the cylindrical rollers used in Test Examples A1 and A2 is from 0.07 μm to 0.10 μm, and at least the surface roughness Ra of the roller end surface (within a range between the first position A and the second position B) in contact with the flange portion of the outer (inner) ring is preferably 0.1 μm or less because low heat generation can be achieved.

Figure 12:
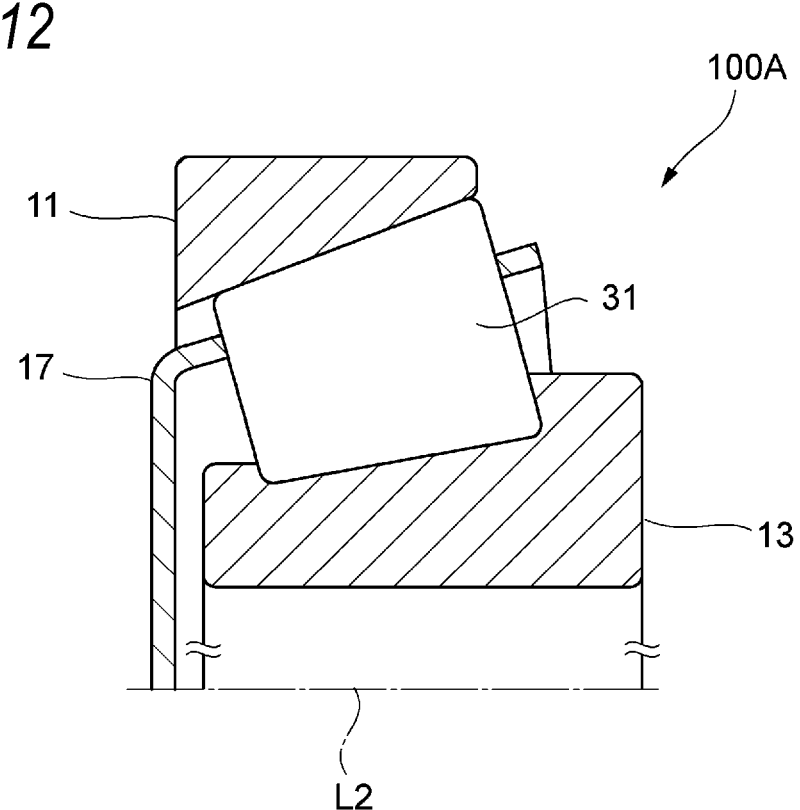
FIG. 12 is a cross-sectional view showing a tapered roller bearing including tapered rollers.
Figure 13:
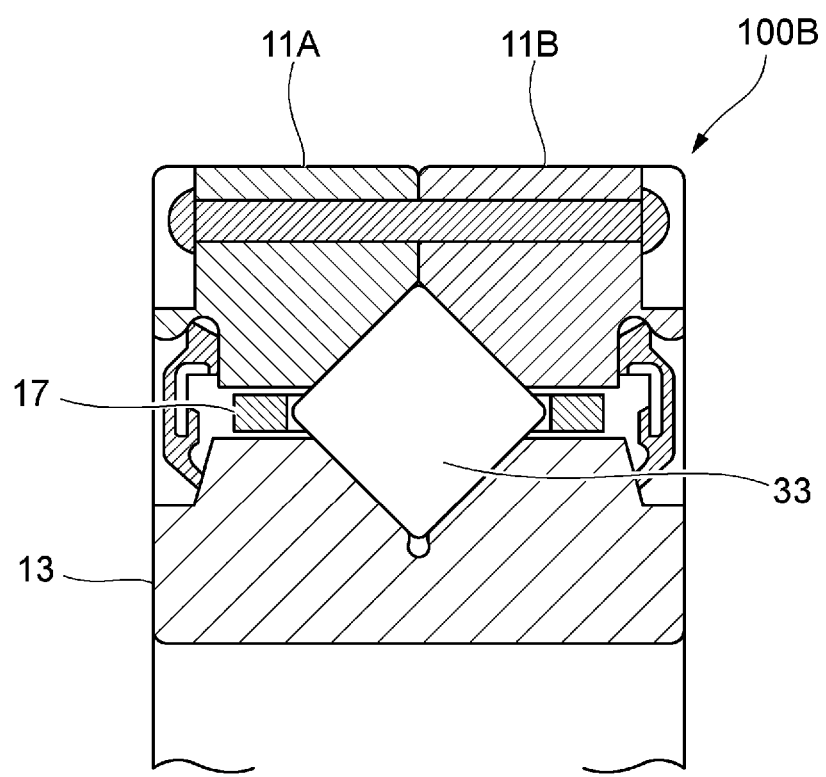
FIG. 13 is a cross-sectional view showing a cross roller bearing including cylindrical rollers.

In the first to fourth configuration examples described above, the roller bearing may be, instead of the cylindrical roller bearing 100 shown in FIG. 1, a tapered roller bearing 100A including tapered rollers 31 shown in FIG. 12, may be a cross roller bearing 100B including a pair of outer rings 11A, 11B, the inner ring 13, and cylindrical rollers 33 as shown in FIG. 13, or may be a cross tapered bearing including tapered rollers, although not shown. In either case, high axial resistance can be obtained even when a large axial load is applied or skew occurs.

<Occurrence of Squeaking Sound>

It is said that, as a condition under which the cylindrical roller bearing is likely to generate the squeaking sound, the squeaking sound is likely to be generated in a case of grease lubrication (hardly generated in a case of oil lubrication), when the rotational speed is relatively low, or when the radial load is relatively small. Therefore, a relatively small radial load (Fr) was applied in a constant state to an NJ type bearing (two outer ring flange portions and one inner ring flange portion) in which the cylindrical rollers 15 (each has an edge-free surface in which intersection portions of the roller inclined surface 15c and the chamfered portion 21 are smoothly connected) of the cylindrical roller bearing 100 shown in FIG. 1 were incorporated, an axial load (Fa) was changed from 0 N (kgf) to a load in which no squeaking sound was generated while changing the rotational speed, thus confirming the presence or absence of the squeaking sound. Hereinafter, test conditions and test results of Test Examples B1 to B4 will be described with reference to FIGS. 14 to 19.

Test Example B1

Figure 14:
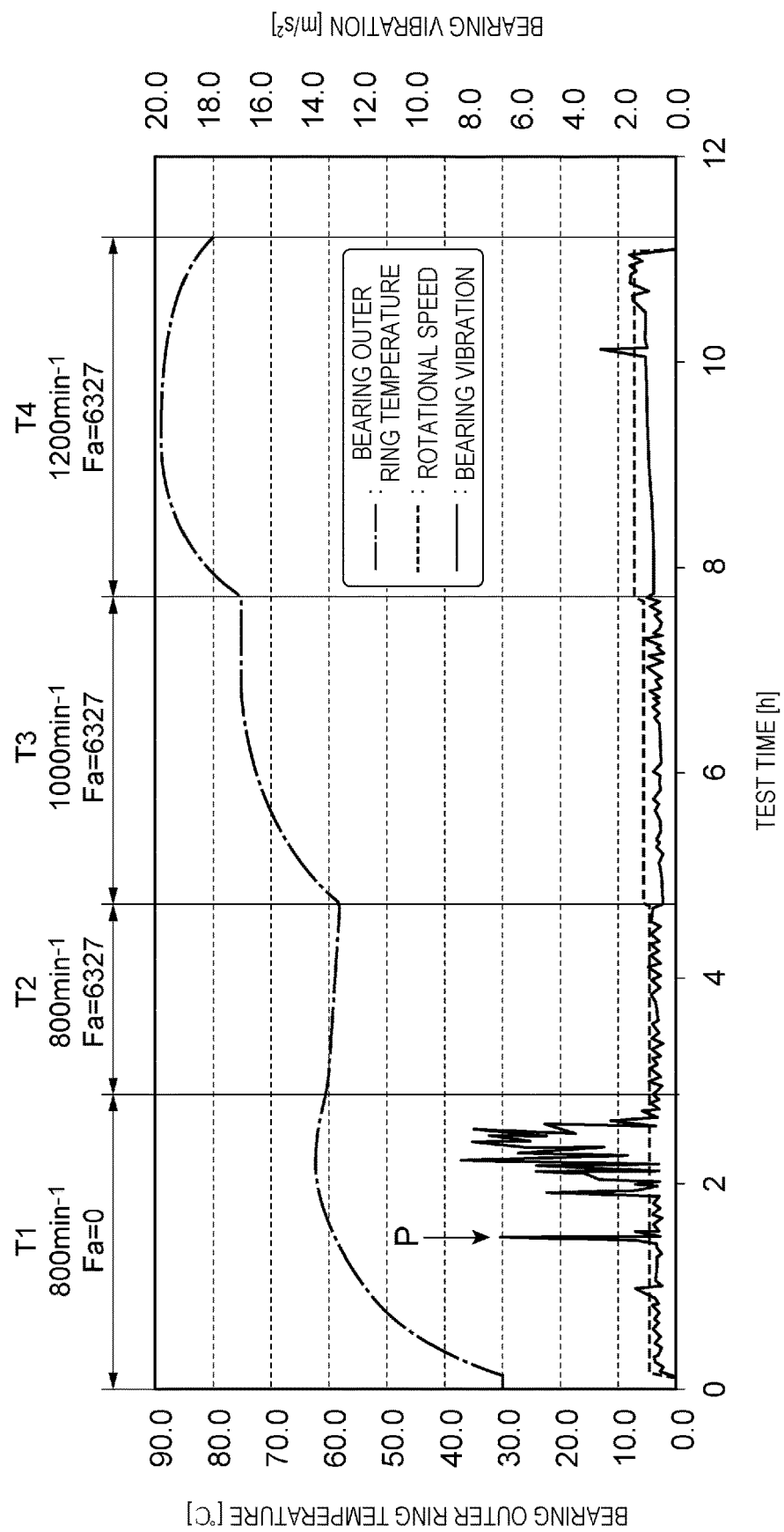
FIG. 14 is a graph showing changes in a bearing outer ring temperature, a bearing vibration, and a rotational speed with respect to a test time, which are test results of Test Example B1.

(Test Conditions)
Test bearing: cylindrical roller bearing (model NJ2326), the bearing when Fa=0 corresponds to a bearing of model NU2326
Grease: Rare MaxSuper (manufactured by KYODO YUSHI CO., LTD.) (space volume: 30%, supply volume: about 330 g, base oil kinematic viscosity: 70 mm$^2$/s (40° C.) (=cSt)
Inner ring rotational speed: 800 min$^{-1}$, 1000 min$^{-1}$, 1200 min$^{-1}$
Determination criteria for the presence or absence of the generation of squeaking sound: a vibration value of the test bearing housing is 2 m/s$^2$ or more, and determine by auditory sense
Radial load: Fr=22622 N (2306 kgf) (P/C=0.02)
Axial load (axial pre-load): Fa=0 N, 6327 N (645 kgf) (Fa/Fr=0.28)
Matters of confirmation: influence of presence or absence of the generation of squeaking sound, the axial pre-load Fa when the radial load Fr (dynamic equivalent load/ basic dynamic rated load: P/C=0.02) is applied, and rotational speed (Test Results)
FIG. 14 shows test results of Test Example B1, and is a graph showing changes in the bearing outer ring temperature, the bearing vibration, and the rotational speed with respect to a test time.

Period T1
 Inner ring rotational speed: 800 min$^{-1}$
 Axial pre-load: Fa=0 N
 Vibration state: after about 2 hours elapsed from the start of the test, the outer ring temperature is substantially constant, and then a squeaking sound (P) was generated.
Period T2
 Inner ring rotational speed: 800 min$^{-1}$
 Axial pre-load: Fa=6327 N
 Vibration state: when an axial pre-load was applied, no squeaking sound was generated.
Period T3
 Inner ring rotational speed: 1000 min$^{-1}$
 Axial pre-load: Fa=6327 N
 Vibration state: when the rotational speed is increased while maintaining the axial pre-load, the outer ring temperature is increased, but no squeaking sound was generated even after the outer ring temperature was stabilized.
Period T4
 Inner ring rotational speed: 1200 min$^{-1}$
 Axial pre-load: Fa=6327 N
 State: the rotational speed was further increased, and no squeaking sound was generated before the outer ring temperature was stabilized Test Example B2

(Test Conditions)
 Inner ring rotational speed: 800 min$^{-1}$, 1000 min$^{-1}$
 Axial pre-load: Fa=0 N, 6327 N (645 kgf) (Fa/Fr=0.28), 9050 N (922.5 kgf) (Fa/Fr=0.4)
 Others were the same as in Test Example B1.

Figure 15:
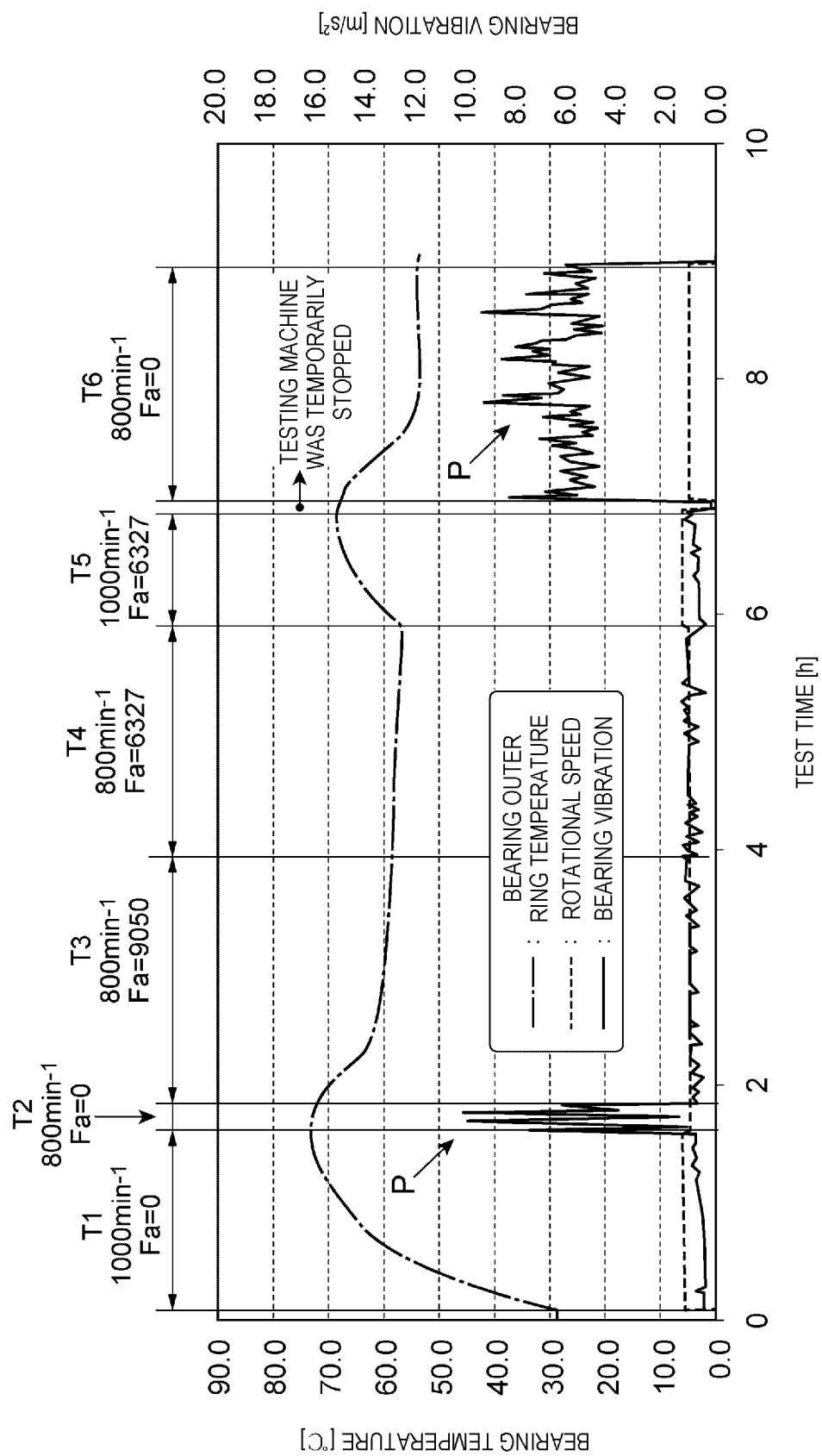
FIG. 15 is a graph showing changes in the bearing outer ring temperature, the bearing vibration, and the rotational speed with respect to a test time, which are test results of Test Example B2.

(Test Results)
FIG. 15 shows the test results of Test Example B2 and is a graph showing changes in the bearing outer ring temperature, the bearing vibration, and the rotational speed with respect to a test time.

Period T1
 Inner ring rotational speed: 1000 min$^{-1}$
 Axial pre-load: Fa=0 N
 Vibration state: in a state where only a radial load was applied, no squeaking sound was generated until about 1.6 hours elapsed.
Period T2
 Inner ring rotational speed: 800 min$^{-1}$
 Axial pre-load: Fa=0 N
 Vibration state: the squeaking sound was generated immediately after the rotational speed was changed.
Period T3
 Inner ring rotational speed: 800 min$^{-1}$
 Axial pre-load: Fa=9050 N
 Vibration state: no squeaking sound was generated at the same time when the axial pre-load was applied.
Period T4
 Inner ring rotational speed: 800 min$^{-1}$
 Axial pre-load: Fa=6327 N
 Vibration state: no squeaking sound was generated for about 2 hours after the axial pre-load was changed.
Period T5
 Inner ring rotational speed: 1000 min$^{-1}$
 Axial pre-load: Fa=6327 N
 Vibration state: no squeaking sound was generated for about 1 hour after the rotational speed was changed.

After the period T5, in order to confirm again the result under the test conditions including the rotational speed of 800 min$^{-1}$ and the axial pre-load Fa=0 N, in which the squeaking sound was generated in Test Example B1, the testing machine was temporarily stopped, and the axial pre-load Fa was also released.

Period T6
    Inner ring rotational speed: 800 $min^{-1}$
    Axial pre-load: Fa=0 N
    Vibration state: the squeaking sound was reliably generated, and reproducibility of Test Example B1 can be confirmed.

Test Example B3

(Test Conditions)
    Inner ring rotational speed: 800 $min^{-1}$, 1000 $min^{-1}$, 1200 $min^{-1}$
    Radial load: Fr=45244 N (4612 kgf) (P/C=0.04)
    Axial pre-load: Fa=0 N, 9050 N (922.5 kgf) (Fa/Fr=0.2)
    Others were the same as in Test Example B1.

Figure 16:
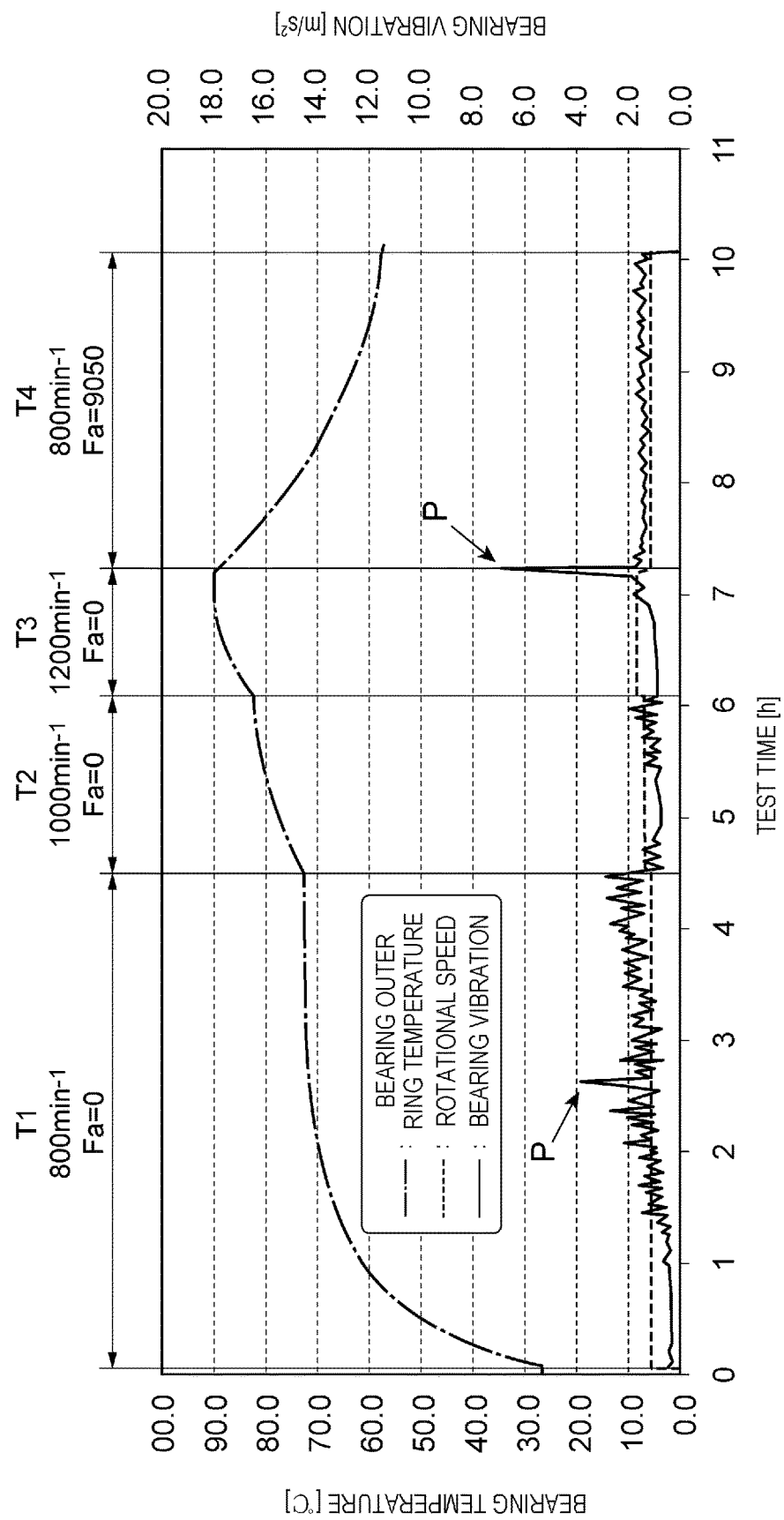
FIG. 16 is a graph showing changes in the bearing outer ring temperature, the bearing vibration, and the rotational speed with respect to a test time, which are test results of Test Example B3.

(Test Results)
FIG. 16 shows the test results of Test Example B3 and is a graph showing changes in the bearing outer ring temperature, the bearing vibration, and the rotational speed with respect to a test time.

Period T1
    Inner ring rotational speed: 800 $min^{-1}$
    Axial pre-load: Fa=0 N
    Vibration state: in a state where only the radial load was applied, the squeaking sound was generated about 1.6 hours elapsed.

Period T2
    Inner ring rotational speed: 1000 $min^{-1}$
    Axial pre-load: Fa=0 N
    Vibration state: no squeaking sound was generated even when the rotational speed was increased. However, the vibration tended to gradually increase.

Period T3
    Inner ring rotational speed: 1200 $min^{-1}$
    Axial pre-load: Fa=0 N
    Vibration state: even when the rotational speed was further increased under the condition of the period T2, no squeaking sound was generated. However, the vibration tended to gradually increase.

Period T4
    Inner ring rotational speed: 800 $min^{-1}$
    Axial pre-load: Fa=9050 N
    Vibration state: the squeaking sound was generated immediately after the rotational speed was reduced. That is, the reproducibility of Test Example B3 (period T1) can be confirmed. After the reproducibility was confirmed, the axial pre-load Fa=9050 N was applied, the squeaking sound was not generated, and thereafter, the squeaking sound was not generated during 3.5 hours to 4 hours.

Test Example B4

(Test Conditions)
    Inner ring rotational speed: 800 $min^{-1}$, 1000 $min^{-1}$, 1200 $min^{-1}$
    Radial load: Fr=22622 N (2306 kgf) (P/C=0.02)
    Axial pre-load: Fa=0 N, 5435 N (554 kgf) (Fa/Fr=0.24)
    Others were the same as in Test Example B1.

Figure 17:
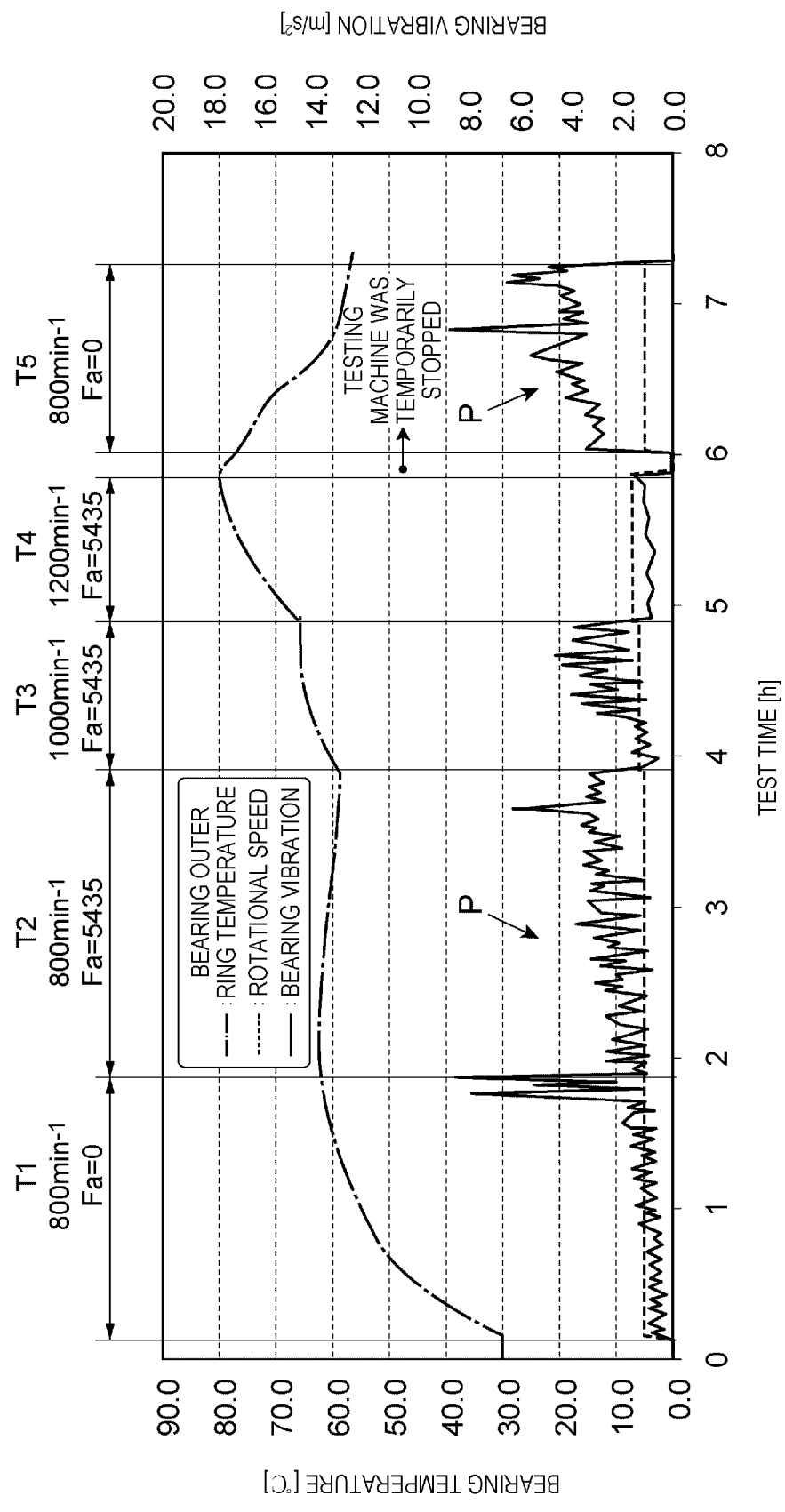
FIG. 17 is a graph showing changes in the bearing outer ring temperature, the bearing vibration, and the rotational speed with respect to a test time, which are test results of Test Example B4.

(Test Results)
FIG. 17 shows the test results of Test Example B4 and is a graph showing changes in the bearing outer ring temperature, the bearing vibration, and the rotational speed with respect to a test time.

Period T1
    Inner ring rotational speed: 800 $min^{-1}$
    Axial pre-load: Fa=0 N
    Vibration state: after about 2 hours elapsed from the start of the test, the outer ring temperature was substantially constant, and then the squeaking sound was generated.

Period T2
    Inner ring rotational speed: 800 $min^{-1}$
    Axial pre-load: Fa=5435 N
    Vibration state: when the axial pre-load is applied, the squeaking sound was smaller than that generated in the period T1, but the state where the squeaking sound is generated was continued.

Period T3
    Inner ring rotational speed: 1000 $min^{-1}$
    Axial pre-load: Fa=5435 N
    Vibration state: even when the rotational speed was increased, the squint sound was continuously generated.

Period T4
    Inner ring rotational speed: 1200 $min^{-1}$
    Axial pre-load: Fa=5435 N
    Vibration state: when the rotational speed was further increased, no squeaking sound was generated. There was a tendency that the higher the rotational speed, the less likely to generate the squeaking sound.

Here, in order to confirm the reproducibility of the state where the squeaking sound is generated, the testing machine was temporarily stopped, and the axial pre-load was released.

Period T5
    Inner ring rotational speed: 800 $min^{-1}$
    Axial pre-load: Fa=0 N
    Vibration state: when the same conditions as those in the period T1 were set again, the squeaking sound was generated, and reproducibility can be confirmed.

Summary of Test Results

Figure 18:
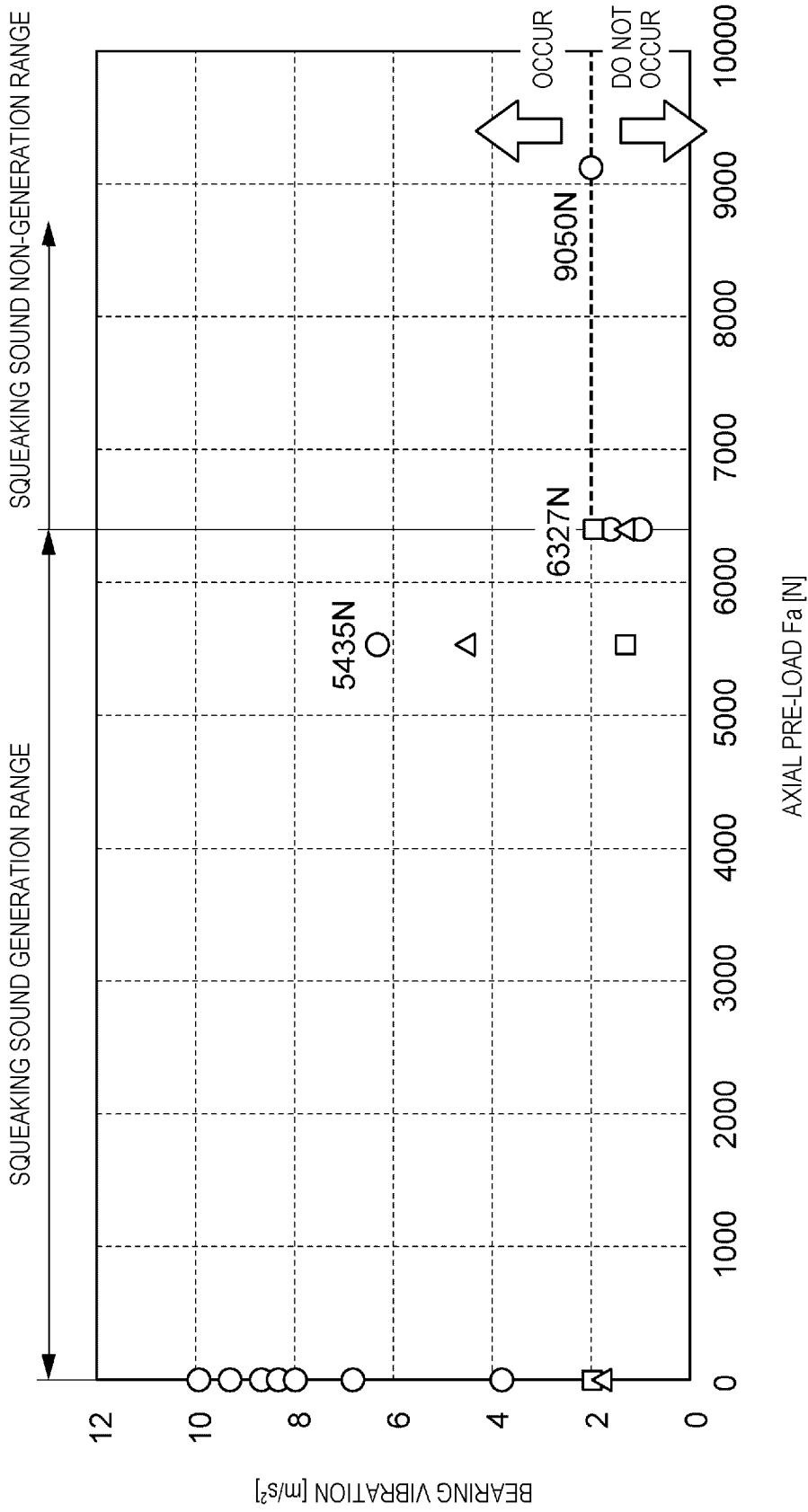
FIG. 18 is a graph showing a distribution of the bearing vibration with respect to an axial pre-load in Test Examples B1 to B4, and showing a generation range and a non-generation range of a squeaking sound.

FIG. 18 is a graph showing a distribution of the bearing vibration with respect to an axial pre-load in Test Examples B1 to B4, and showing a generation range and a non-generation range of the squeaking sound.

As a result of confirmation with the axial pre-load Fa=0 N, 5435 N, 6327 N, and 9050 N, the squeaking sound is generated when Fa is less than 6327 N, and the squeaking sound is not generated when Fa is 6327 N or more. When the outer ring or the inner ring, which is a rotating ring of the cylindrical roller bearing, is rotating, both end surfaces of all the cylindrical rollers incorporated in the cylindrical roller bearing are brought into contact with a pair of flange portions on a diagonal line by applying a constant axial pre-load in the axial direction such that the end surfaces are brought into constant contact with the flange portions. Therefore, even when all the rollers pass through the non-load zone, there is no gap for all the rollers to move in the axial direction to generate the squeaking sound. Therefore, it is presumed that the squeaking sound is prevented.

As described above, by eliminating the edge portion at a connection position between the roller end surface 15a and the chamfered portion 21 shown in FIG. 2 and smoothly connecting the roller end surface 15a and the chamfered portion 21, heat generation and vibration due to an edge load generated during contact between the cylindrical roller 15 and the inner ring flange portion 19 (the same applies to the outer ring flange portion) facing the cylindrical roller 15 can be avoided. By applying the axial pre-load to the cylindrical roller bearing 100, the generation of squeaking sound can be reliably prevented even in a load range and a rotational speed range in which the squeaking sound is generated in the product in the related art.

Figure 19:
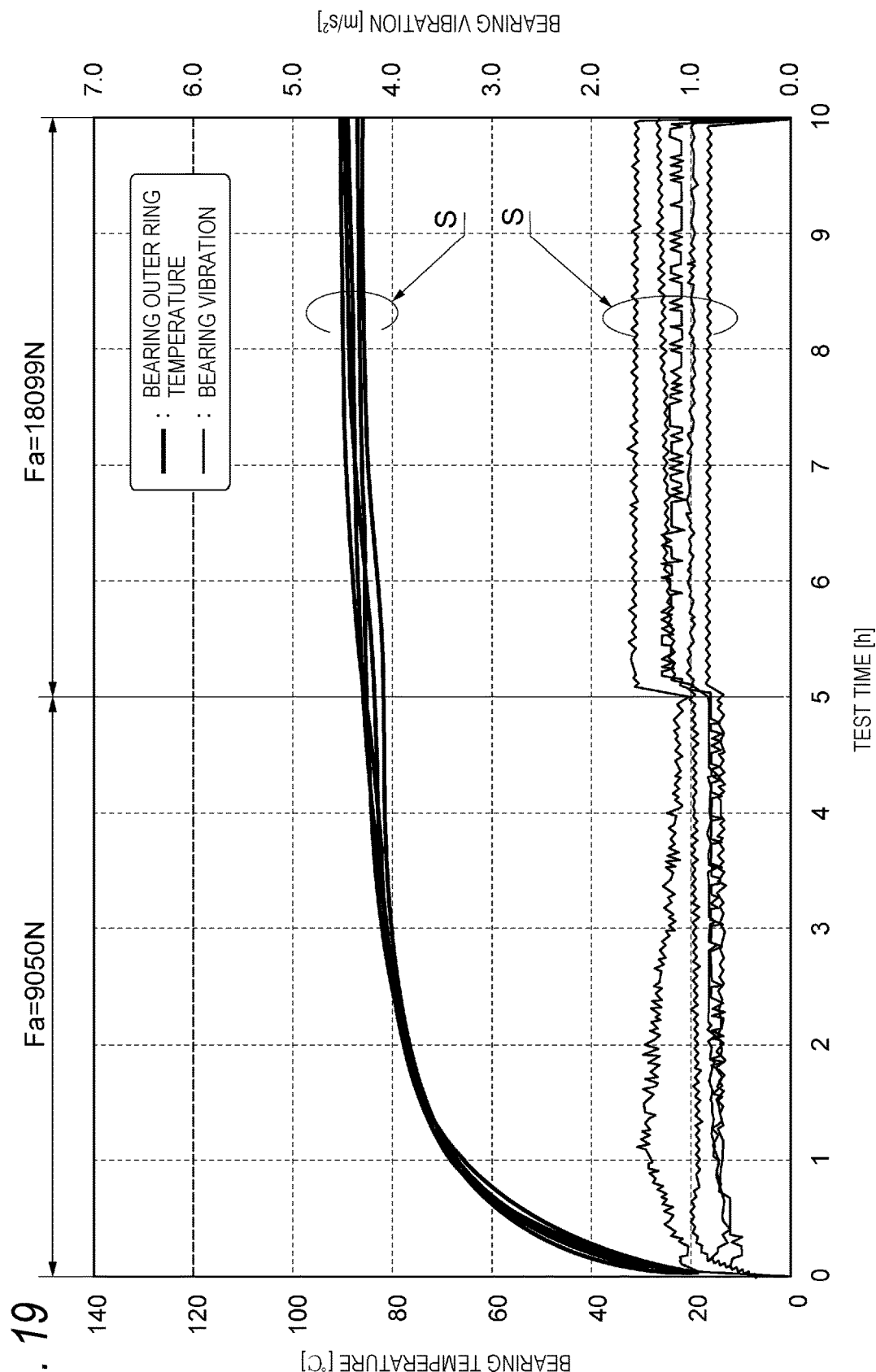
FIG. 19 is a graph showing behaviors of a bearing temperature and the bearing vibration in the cylindrical roller bearing shown in FIGS. 1 and 2.

FIG. 19 is a graph showing behaviors of the bearing temperature and the bearing vibration in the cylindrical roller bearing shown in FIGS. 1 and 2. The results of the cylindrical roller bearing shown in FIGS. 1 and 2 are shown on a graph as a symbol S.

In the cylindrical roller bearing 100 of this configuration, since the connection position between the roller inclined surface 15c and the chamfered portion 21 is formed by a smooth curved surface without an edge, heat generation and vibration due to an edge load generated when the cylindrical roller 15 and the inner ring flange portion 19 come into contact with each other can be avoided. Further, even when the axial pre-load Fa=18099 N is applied, there is no abnormality in both heat generation and vibration.

For example, a shape in the vicinity of the contact position between the inner ring flange portion 19 and the cylindrical roller 15 may be similarly formed in the outer ring flange portion 12b formed in the outer ring 11 shown in FIG. 1.

The cylindrical roller bearing 100 of the present embodiment is of the NJ type including two outer ring flange portions and one inner ring flange portion, but the cylindrical roller bearing 100 is also applicable to those of NUP, NF, and NH types. In any case, a shape in the vicinity of a contact position between a flange portion and a cylindrical roller to which an axial pre-load is applied is the same as the shape in the vicinity of the contact position between the inner ring flange portion 19 and the cylindrical roller 15 described above.

As described above, the following matters are disclosed in the present description.

(1) A roller bearing including: an outer ring having a raceway surface on an inner circumferential surface thereof; an inner ring having a raceway surface on an outer circumferential surface thereof; and a plurality of rollers rollably disposed between the outer ring and the inner ring, in which
  on one or both of the outer ring and the inner ring, flange portions each protruding in a radial direction from the raceway surface and having a guide surface which guides each of the plurality of rollers in sliding contact with a roller end surface of each of the plurality of rollers is formed,
  each of the plurality of rollers includes chamfered portions which are formed at both axial ends of a roller outer circumferential surface, and roller inclined surfaces each of which is provided to a roller inner diameter side of the roller end surface from an axial end of the chamfered portion and faces the guide surface of the flange portion, and
  when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position,
  an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$, $\alpha<\theta<\beta$ is satisfied.

According to the roller bearing, when a contact point between the guide surface of the flange portion and the roller end surface is the first position A, the roller end surface has an inclination less than the inclination of the guide surface, so that the contact point does not move inward in the radial direction from the first position A. In addition, when the contact point is the second position, the roller end surface has an inclination larger than that of the guide surface, so that the contact point does not move outward in the radial direction from the second position. Therefore, the contact point between the guide surface of the flange portion and the roller end surface falls within a range from the first position to the second position on the roller end surface. Accordingly, edge contact does not occur between the roller end surface and the guide surface, and rapid heat generation due to rapid edge load can be prevented. As a result, high axial resistance can be obtained even when a large axial load is applied or skew occurs. In addition, a gap between the roller end surface and the guide surface is ensured, supply of a lubricant is improved, and a cooling effect can be improved.

(2) The roller bearing according to (1), in which a grinding recess extending in the radial direction instead of a grinding recess portion extending in an axial direction is formed at an end portion of the guide surface on a raceway surface side.

According to the roller bearing, since there is no edge contact between the roller end surface portion and a guide portion of the flange portion, generation of an edge load can be prevented and the axial resistance performance can be improved.

(3) The roller bearing according to (1) or (2), in which surface roughness Ra of the guide surface is 0.1 μm or less.

According to the roller bearing, heat generation due to sliding contact between the guide surface of the flange portion and the end surface is reduced.

(4) The roller bearing according to any one of (1) to (3), in which the roller bearing is any one of a cylindrical roller bearing, a tapered roller bearing, a cross roller bearing including cylindrical rollers, and a cross tapered bearing including tapered rollers.

According to the roller bearing, high axial resistance performance is obtained even when a large axial load is applied or skew occurs.

(5) A roller bearing for a cylindrical roller bearing unit, the cylindrical roller bearing unit including: the roller bearing according to any one of (1) to (3); a pre-load unit configured to apply a constant axial pre-load to the outer ring or the inner ring; and a regulation portion configured to regulate an axial movement of the inner ring or the outer ring that receives the pre-load from the pre-load unit, and each of the plurality of rollers of the roller bearing being a cylindrical roller,
  the roller bearing being configured to be applied a constant axial pre-load in an axial direction such that both end surfaces of all of plurality of the rollers incorporated in the roller bearing are in constant contact with the respective flange portions when the outer ring or the inner ring, which is a rotating ring of the roller bearing, is rotating, whereby a squeaking sound is prevented.

According to the roller bearing, an edge load generated during contact between the roller end surface and the outer ring flange portion and the inner ring flange portion can be avoided, and abnormal heat generation does not occur. In addition, by applying the axial pre-load, behaviors of the cylindrical rollers can be reliably regulated, and generation of the squeaking sound can be reliably prevented.

(6) The roller bearing according to (5), in which a connecting portion between the roller inclined surface and the chamfered portion is formed by a curved surface without an edge, the axial pre-load in the axial direction is applied to a one-side surface of the outer ring and an another-side surface of the inner ring among one-side surfaces and another-side surfaces of the outer ring and the inner ring, whereby the squeaking sound is prevented.

According to the roller bearing, edge contact does not occur between the roller end surface and the guide surface, and rapid heat generation due to edge load can be prevented.

(7) A roller bearing unit including:
the roller bearing according to (5) or (6); and
a regulation portion configured to regulate an axial movement of the inner ring or the outer ring that receives a pre-load from a pre-load unit, in which
the constant axial pre-load in the axial direction is applied such that both end surfaces of all of the plurality of rollers incorporated in the roller bearing are in constant contact with the respective flange portions when the outer ring or the inner ring, which is a rotating ring of the roller bearing, is rotating, whereby the squeaking sound is prevented.

According to the roller bearing unit, the axial pre-load is accurately applied to the cylindrical roller bearing by the pre-load unit and the regulation portion, and the axial movement is reliably regulated. Therefore, there is no abnormal heat generation, and the squeaking sound can be prevented.

(8) A motor including:
a rotation shaft on which a rotor is provided;
a housing on which a stator is provided; and
the roller bearing unit according to (7), by which the rotation shaft is rotatably supported in the housing.

According to the motor, a silent motor is obtained in which there is no abnormal heat generation and the squeaking sound is not generated when the motor is driven.

(9) A method for manufacturing a roller bearing, the roller bearing including: an outer ring having a raceway surface on an inner circumferential surface thereof; an inner ring having a raceway surface on an outer circumferential surface thereof; and a plurality of rollers rollably disposed between the outer ring and the inner ring, one or both of the outer ring and the inner ring being provided a flange portion protruding in a radial direction from the raceway surface, the flange portion having a guide surface that guides each of the plurality of rollers in sliding contact with a roller end surface of each of the plurality of rollers, and each of the plurality of rollers including chamfered portions which are formed at both axial ends of a roller outer circumferential surface, and roller inclined surfaces each of which is provided to a roller inner diameter side of the roller end surface from an axial end of the chamfered portion and faces the guide surface of the flange portion,
the method including,
satisfying $\alpha < \theta < \beta$ when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position, an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$.

According to the method for manufacturing a roller bearing, when the contact point between the guide surface of the flange portion and the end surface is the first position A, the roller end surface has an inclination less than the inclination of the guide surface, so that the contact point does not move inward in the radial direction of the roller from the first position A. In addition, when the contact point is the second position, the roller end surface has an inclination larger than that of the guide surface, so that the contact point does not move outward in the radial direction of the roller from the second position. Therefore, the contact point between the guide surface of the flange portion and the roller end surface falls within a range from the first position to the second position on the roller end surface. Accordingly, edge contact does not occur between the roller end surface and the guide surface, and rapid heat generation due to edge load can be prevented. As a result, high axial resistance can be obtained even when a large axial load is applied or skew occurs. In addition, a gap between the roller end surface and the guide surface is ensured, supply of a lubricant is improved, and a cooling effect can be improved.

(10) A method for silencing a roller bearing, the roller bearing including: an outer ring having a raceway surface on an inner circumferential surface thereof; an inner ring having a raceway surface on an outer circumferential surface thereof; and a plurality of cylindrical rollers rollably disposed between the outer ring and the inner ring, each of the outer ring and the inner ring being provided flange portions each protruding in a radial direction from the raceway surface and having a guide surface which guides each of the plurality of rollers in sliding contact with a roller end surface of each of the plurality of rollers,
the method including, applying a constant axial pre-load in an axial direction to a one-side surface of the outer ring and an another-side surface of the inner ring among one-side surfaces and another-side surfaces of the outer ring and the inner ring such that both end surfaces of all of the plurality of rollers incorporated in the roller bearing are in constant contact with the respective flange portions when the outer ring or the inner ring, which is a rotating ring of the roller bearing, is rotating, whereby preventing a squeaking sound.

According to the method for silencing a roller bearing, by applying the axial pre-load, behaviors of the rollers can be reliably regulated, and generation of the squeaking sound can be reliably prevented.

As described above, the present invention is not limited to the embodiment described above, and combinations of the respective configurations of the embodiments and modifications and applications by those skilled in the art based on the description of the specification and well-known techniques are also intended by the present invention and are included in the scope of the protection.

The invention claimed is:
1. A roller bearing comprising:
an outer ring having a raceway surface on an inner circumferential surface thereof;
an inner ring having a raceway surface on an outer circumferential surface thereof; and a plurality of rollers rollably disposed between the outer ring and the inner ring, wherein on one or both of the outer ring and the inner ring, flange portions each protruding in a radial direction from the raceway surface and having a guide surface which guides each of the plurality of rollers in sliding contact with a roller end surface of each of the plurality of rollers are formed, each of the plurality of rollers includes chamfered portions which are formed at both axial ends of a roller outer circumferential surface, and roller inclined surfaces each of which is provided to a roller inner diameter side of the roller end surface from an axial end of the chamfered portion and faces the guide surface of the flange portion, and when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position, an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$, $\alpha<\theta<\beta$ is satisfied.

2. The roller bearing according to claim 1, wherein a grinding recess extending in the radial direction instead of a grinding recess portion extending in an axial direction is formed at an end portion of the guide surface on a raceway surface side.

3. The roller bearing according to claim 1, wherein surface roughness Ra of the guide surface is 0.1 μm or less.

4. The roller bearing according to claim 1, wherein the roller bearing is any one of a cylindrical roller bearing, a tapered roller bearing, a cross roller bearing including cylindrical rollers, and a cross tapered bearing including tapered rollers.

5. A roller bearing for a cylindrical roller bearing unit, the cylindrical roller bearing unit including:
   the roller bearing according to claim 1;
   a pre-load unit configured to apply a constant axial pre-load to the outer ring or the inner ring; and
   a regulation portion configured to regulate an axial movement of the inner ring or the outer ring that receives the pre-load from the pre-load unit, and
   each of the plurality of rollers of the roller bearing being a cylindrical roller,
the roller bearing being configured to be applied the constant axial pre-load in an axial direction such that both end surfaces of all of the plurality of rollers incorporated in the roller bearing are in constant contact with the respective flange portions when the outer ring or the inner ring, which is a rotating ring of the roller bearing, is rotating.

6. The roller bearing according to claim 5, wherein a connecting portion between the roller inclined surface and the chamfered portion is formed by a curved surface without an edge, and the axial pre-load in the axial direction is applied to a one-side surface of the outer ring and an another-side surface of the inner ring among one-side surfaces and another-side surfaces of the outer ring and the inner ring.

7. A roller bearing unit comprising:
   the roller bearing according to claim 5; and
   a regulation portion configured to regulate an axial movement of the inner ring or the outer ring that receives a pre-load from the pre-load unit, wherein
the constant axial pre-load in the axial direction is applied such that both end surfaces of all of the plurality of rollers incorporated in the roller bearing are in constant contact with the respective flange portions when the outer ring or the inner ring, which is a rotating ring of the roller bearing, is rotating.

8. A motor comprising:
   a rotation shaft on which a rotor is provided;
   a housing on which a stator is provided; and
   the roller bearing unit according to claim 7 by which the rotation shaft is rotatably supported in the housing.

9. A method for manufacturing a roller bearing, the roller bearing including:
   an outer ring having a raceway surface on an inner circumferential surface thereof;
   an inner ring having a raceway surface on an outer circumferential surface thereof; and
   a plurality of rollers rollably disposed between the outer ring and the inner ring,
   one or both of the outer ring and the inner ring being provided a flange portion protruding in a radial direction from the raceway surface,
   the flange portion having a guide surface that guides each of the plurality of rollers in sliding contact with a roller end surface of each of the plurality of rollers, and
   each of the plurality of rollers including chamfered portions which are formed at both axial ends of a roller outer circumferential surface, and roller inclined surfaces each of which is provided to a roller inner diameter side of the roller end surface from an axial end of the chamfered portion and faces the guide surface of the flange portion,
the method comprising,
satisfying $\alpha<\theta<\beta$ when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position, an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$.

10. A method for silencing a roller bearing, the roller bearing including:
    an outer ring having a raceway surface on an inner circumferential surface thereof;
    an inner ring having a raceway surface on an outer circumferential surface thereof; and a plurality of cylindrical rollers, rollably disposed between the outer ring and the inner ring, each of the outer ring and the inner ring being provided with flange portions each protruding in a radial direction from the raceway surface and having a guide surface that guides each of the plurality of rollers in sliding contact with a roller end surface of each of the plurality of rollers, each of the plurality of rollers includes chamfered portions which are formed at both axial ends of a roller outer circumferential surface, and roller inclined surfaces each of which is provided to a roller inner diameter side of the roller end surface from an axial end of the chamfered portion and faces the guide surface of the flange portion, and when in a cross section taken along a plane including a rotation axis of each of the plurality of rollers and a bearing central axis, a radial position of the roller inclined surface facing to an end portion of the guide surface on a flange portion protruding side is defined as a first position, a radial position of a boundary between the chamfered portion and the roller inclined surface is defined as a second position, an intersection angle between a tangent line of the roller inclined surface at the first position and a perpendicular line of the rotation axis of each of the plurality of rollers is defined as $\alpha$, an intersection angle between a tangent line of the roller inclined surface at the second position and a perpendicular line of the rotation axis of each of the plurality of rollers is defined as $\beta$, and an intersection angle between the guide surface and a perpendicular line of the bearing central axis is defined as $\theta$, $\alpha<\theta<\beta$ is satisfied, the method comprising, applying a constant axial pre-load in an axial direction to a one-side surface of the outer ring and an another-side surface of the inner ring among one-side surfaces and another-side surfaces of the outer ring and the inner ring, respectively, such that both end surfaces of all of the plurality of rollers incorporated in the roller bearing are in constant contact with the respective flange portions when the outer ring or the inner ring, which is a rotating ring of the roller bearing, is rotating.

* * * * *